United States Patent
Satish et al.

(10) Patent No.: US 11,727,572 B2
(45) Date of Patent: *Aug. 15, 2023

(54) METHODS AND SYSTEMS FOR CHARACTERIZING FLUIDS FROM A PATIENT

(71) Applicant: Gauss Surgical, Inc., Menlo Park, CA (US)

(72) Inventors: Siddarth Satish, Redwood City, CA (US); Kevin J. Miller, Mountain View, CA (US)

(73) Assignee: Gauss Surgical Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,629

(22) Filed: Jun. 30, 2022

(65) Prior Publication Data

US 2022/0327708 A1    Oct. 13, 2022

Related U.S. Application Data

(63) Continuation of application No. 16/986,771, filed on Aug. 6, 2020, now Pat. No. 11,410,311, which is a
(Continued)

(51) Int. Cl.
*G06T 7/00* (2017.01)
*G06T 7/62* (2017.01)
(Continued)

(52) U.S. Cl.
CPC .......... *G06T 7/0016* (2013.01); *G06F 18/24* (2023.01); *G06T 7/62* (2017.01); *G06V 10/764* (2022.01);
(Continued)

(58) Field of Classification Search
CPC ............... G06T 7/0016; G06T 7/62; G06T 2207/10016; G06T 2207/10024;
(Continued)

(56) References Cited

U.S. PATENT DOCUMENTS 2,707,955 A    5/1955  Borden
3,182,252 A    5/1965  Den Berg
(Continued)

FOREIGN PATENT DOCUMENTS

CA    2870635 A1    10/2013
CA    3079209 A1 *  4/2019  ........... A61B 5/0261
(Continued)

OTHER PUBLICATIONS

Aklilu, A. Gauss Surgical Measures Blood Loss with a Smartphone. Jun. 14, 2012. <http://www.health2con.com/news/2012/06/14/gauss-surgical-measur- es-blood-loss-with-a-smartphone/>, 6 pages.
(Continued)

*Primary Examiner* — Pinalben Patel
(74) *Attorney, Agent, or Firm* — Howard & Howard Attorneys PLLC

(57) ABSTRACT

Methods for characterizing fluids from a patient. A time series of images of a conduit are received, and a conduit image region in the images is identified. A flow type of the fluids passing through the conduit may be classified as one of air, laminar liquid, and turbulent liquid by evaluating an air-liquid boundary of the fluid. A volumetric flow rate of the fluids in the conduit is estimated. The volumetric flow rate may be based on the classified flow type. A concentration of a blood component of the fluids passing through the conduit may be estimated based on the images. A proportion of the fluid that is blood may also be determined, and a volume of blood that has passed through the conduit within a predetermined period of time may be estimated based on the
(Continued)

estimated total volumetric flow rate and the determined proportion.

20 Claims, 16 Drawing Sheets

Related U.S. Application Data continuation of application No. 15/154,929, filed on May 13, 2016, now Pat. No. 10,789,710.

(60) Provisional application No. 62/232,255, filed on Sep. 24, 2015, provisional application No. 62/162,154, filed on May 15, 2015.

(51) Int. Cl.
*G06V 10/764* (2022.01)
*G01F 1/00* (2022.01)
*G01F 1/661* (2022.01)
*G06F 18/24* (2023.01)

(52) U.S. Cl.
CPC ............... *G01F 1/00* (2013.01); *G01F 1/661* (2013.01); *G06T 2207/10016* (2013.01); *G06T 2207/10024* (2013.01); *G06T 2207/30024* (2013.01); *G06T 2207/30104* (2013.01); *G06V 2201/03* (2022.01)

(58) Field of Classification Search
CPC ........... G06T 2207/30024; G06T 2207/30104; G06K 9/6267; G06V 2201/03; G01F 1/00; G01F 1/661
See application file for complete search history.

(56) References Cited

U.S. PATENT DOCUMENTS

| | | |
|---|---|---|
| 3,199,507 A | 8/1965 | Kamm |
| 3,367,431 A | 2/1968 | Baker |
| 3,446,073 A | 5/1969 | Auphan |
| 3,646,938 A | 3/1972 | Haswell |
| 3,832,135 A | 8/1974 | Chlupsa et al. |
| 3,864,571 A | 2/1975 | Stillman et al. |
| 3,948,390 A | 4/1976 | Ferreri |
| 4,105,019 A | 8/1978 | Haswell |
| 4,149,537 A | 4/1979 | Haswell |
| 4,317,178 A | 2/1982 | Head |
| 4,402,373 A | 9/1983 | Comeau |
| 4,422,548 A | 12/1983 | Cheesman et al. |
| 4,429,789 A | 2/1984 | Puckett |
| 4,562,842 A | 1/1986 | Morfeld et al. |
| 4,583,546 A | 4/1986 | Garde |
| 4,642,089 A | 2/1987 | Zupkas et al. |
| 4,681,571 A | 7/1987 | Nehring |
| 4,754,641 A | 7/1988 | Orban |
| 4,773,423 A | 9/1988 | Hakky |
| 4,784,267 A | 11/1988 | Gessler et al. |
| 4,832,198 A | 5/1989 | Alikhan |
| 4,922,922 A | 5/1990 | Pollock et al. |
| 5,029,584 A | 7/1991 | Smith |
| 5,031,642 A | 7/1991 | Nosek |
| 5,048,683 A | 9/1991 | Westlake |
| 5,119,814 A | 6/1992 | Minnich |
| 5,132,087 A | 7/1992 | Manion et al. |
| 5,190,059 A | 3/1993 | Fabian et al. |
| 5,231,032 A | 7/1993 | Ludvigsen |
| 5,236,664 A | 8/1993 | Ludvigsen |
| 5,285,682 A | 2/1994 | Micklish |
| 5,348,533 A | 9/1994 | Papillon |
| 5,369,713 A | 11/1994 | Schwartz et al. |
| 5,492,537 A | 2/1996 | Vancaillie |
| 5,522,805 A | 6/1996 | Vancaillie et al. |
| 5,629,498 A | 5/1997 | Pollock et al. |
| 5,633,166 A | 5/1997 | Westgard et al. |
| 5,650,596 A | 7/1997 | Morris et al. |
| 5,709,670 A | 1/1998 | Vancaillie et al. |
| 5,807,358 A | 9/1998 | Herweck et al. |
| 5,851,835 A | 12/1998 | Groner |
| 5,923,001 A | 7/1999 | Morris et al. |
| 5,931,824 A | 8/1999 | Stewart et al. |
| 5,944,668 A | 8/1999 | Vancaillie et al. |
| 5,956,130 A | 9/1999 | Vancaillie et al. |
| 5,984,893 A | 11/1999 | Ward |
| 6,061,583 A | 5/2000 | Ishihara et al. |
| 6,359,683 B1 | 3/2002 | Berndt |
| 6,377,832 B1 | 4/2002 | Bergman |
| 6,510,330 B1 | 1/2003 | Enejder |
| 6,699,231 B1 | 3/2004 | Sterman |
| 6,730,054 B2 | 5/2004 | Pierce et al. |
| 6,777,623 B2 | 8/2004 | Ballard |
| 7,001,366 B2 | 2/2006 | Ballard |
| 7,112,273 B2 | 9/2006 | Weigel et al. |
| 7,147,626 B2 | 12/2006 | Goodman et al. |
| 7,274,947 B2 | 9/2007 | Koo et al. |
| 7,364,545 B2 | 4/2008 | Klein |
| 7,384,399 B2 | 6/2008 | Ghajar |
| 7,430,047 B2 | 9/2008 | Budd et al. |
| 7,469,727 B2 | 12/2008 | Marshall |
| 7,499,581 B2 | 3/2009 | Tribble et al. |
| 7,641,612 B1 | 1/2010 | McCall |
| D611,731 S | 3/2010 | Levine |
| 7,670,289 B1 | 3/2010 | McCall |
| 7,703,674 B2 | 4/2010 | Stewart et al. |
| 7,708,700 B2 | 5/2010 | Ghajar |
| 7,711,403 B2 | 5/2010 | Jay et al. |
| 7,749,217 B2 | 7/2010 | Podhajsky |
| 7,795,491 B2 | 9/2010 | Stewart et al. |
| 7,819,818 B2 | 10/2010 | Ghajar |
| 7,909,806 B2 | 3/2011 | Goodman et al. |
| 7,966,269 B2 | 6/2011 | Bauer et al. |
| 7,995,816 B2 | 8/2011 | Roger et al. |
| 8,025,173 B2 | 9/2011 | Michaels |
| 8,181,860 B2 | 5/2012 | Fleck et al. |
| 8,194,235 B2 | 6/2012 | Kosaka et al. |
| 8,241,238 B2 | 8/2012 | Hiruma |
| 8,398,546 B2 | 3/2013 | Pacione et al. |
| 8,472,693 B2 | 6/2013 | Davis et al. |
| 8,626,268 B2 | 1/2014 | Adler et al. |
| 8,693,753 B2 | 4/2014 | Nakamura |
| 8,704,178 B1 | 4/2014 | Pollock et al. |
| 8,792,693 B2 | 7/2014 | Satish et al. |
| 8,897,523 B2 | 11/2014 | Satish et al. |
| 8,983,167 B2 | 3/2015 | Satish et al. |
| 9,047,663 B2 | 6/2015 | Satish et al. |
| 9,171,368 B2 | 10/2015 | Satish et al. |
| 9,595,104 B2 | 3/2017 | Satish et al. |
| 9,646,375 B2 | 5/2017 | Satish et al. |
| 9,652,655 B2 | 5/2017 | Satish et al. |
| 9,773,320 B2 | 9/2017 | Satish et al. |
| 9,824,441 B2 | 11/2017 | Satish et al. |
| 9,870,625 B2 | 1/2018 | Satish et al. |
| 9,928,593 B2 | 3/2018 | Ooga |
| 9,936,906 B2 | 4/2018 | Satish et al. |
| 10,282,839 B2 | 5/2019 | Satish et al. |
| 10,424,060 B2 | 9/2019 | Satish et al. |
| 10,426,356 B2 | 10/2019 | Satish et al. |
| 10,528,782 B2 | 1/2020 | Satish et al. |
| 10,555,675 B2 | 2/2020 | Satish et al. |
| 10,641,644 B2 | 5/2020 | Satish et al. |
| 10,706,541 B2 | 7/2020 | Satish et al. |
| 10,789,710 B2 * | 9/2020 | Satish .................. G06V 10/764 |
| 10,863,933 B2 | 12/2020 | Satish et al. |
| 10,957,179 B2 | 3/2021 | Satish et al. |
| 11,109,941 B2 | 9/2021 | Kumar et al. |
| 11,176,663 B2 | 11/2021 | Satish et al. |
| 2002/0089659 A1 | 7/2002 | Williamson et al. |
| 2003/0130596 A1 | 7/2003 | Goltz |
| 2004/0031626 A1 | 2/2004 | Morris et al. |
| 2004/0129678 A1 | 7/2004 | Crowley et al. |
| 2005/0051466 A1 | 3/2005 | Carter et al. |
| 2005/0163354 A1 | 7/2005 | Ziegler |
| 2005/0265996 A1 | 12/2005 | Lentz |

(56) References Cited

U.S. PATENT DOCUMENTS

| | | |
|---|---|---|
| 2006/0058593 A1 | 3/2006 | Drinan et al. |
| 2006/0178578 A1 | 8/2006 | Tribble et al. |
| 2006/0211071 A1 | 9/2006 | Andre |
| 2006/0224086 A1 | 10/2006 | Harty |
| 2007/0004959 A1 | 1/2007 | Carrier et al. |
| 2007/0108129 A1 | 5/2007 | Mori |
| 2007/0243137 A1 | 10/2007 | Hainfeld |
| 2007/0287182 A1 | 12/2007 | Morris et al. |
| 2008/0029416 A1 | 2/2008 | Paxton |
| 2008/0030303 A1 | 2/2008 | Kobren et al. |
| 2008/0045845 A1 | 2/2008 | Pfeiffer et al. |
| 2008/0194906 A1 | 8/2008 | Mahony et al. |
| 2009/0076470 A1 | 3/2009 | Ryan |
| 2009/0080757 A1 | 3/2009 | Roger et al. |
| 2009/0234595 A1 | 9/2009 | Okcay et al. |
| 2009/0310123 A1 | 12/2009 | Thomson |
| 2009/0317002 A1 | 12/2009 | Dein |
| 2010/0003714 A1 | 1/2010 | Bachur, Jr. et al. |
| 2010/0007727 A1 | 1/2010 | Torre-Bueno |
| 2010/0027868 A1 | 2/2010 | Kosaka et al. |
| 2010/0066996 A1 | 3/2010 | Kosaka et al. |
| 2010/0087770 A1 | 4/2010 | Bock |
| 2010/0142773 A1 | 6/2010 | Cha |
| 2010/0150759 A1 | 6/2010 | Mazur |
| 2011/0066182 A1 | 3/2011 | Falus |
| 2011/0118647 A1 | 5/2011 | Paolini |
| 2011/0157351 A1 | 6/2011 | Pollack |
| 2011/0192745 A1 | 8/2011 | Min |
| 2011/0196321 A1 | 8/2011 | Wudyka |
| 2011/0200239 A1 | 8/2011 | Levine et al. |
| 2011/0268329 A1 | 11/2011 | Pronkine |
| 2011/0275957 A1 | 11/2011 | Bhandari |
| 2011/0305376 A1 | 12/2011 | Neff |
| 2011/0316973 A1 | 12/2011 | Miller et al. |
| 2012/0000297 A1 | 1/2012 | Hashizume et al. |
| 2012/0064132 A1 | 3/2012 | Aizawa |
| 2012/0065482 A1 | 3/2012 | Robinson et al. |
| 2012/0127290 A1 | 5/2012 | Tojo et al. |
| 2012/0210778 A1 | 8/2012 | Palmer et al. |
| 2012/0257188 A1 | 10/2012 | Yan et al. |
| 2012/0262704 A1 | 10/2012 | Zahniser et al. |
| 2012/0309636 A1 | 12/2012 | Gibbons et al. |
| 2012/0327365 A1 | 12/2012 | Makihira |
| 2013/0010094 A1 | 1/2013 | Satish et al. |
| 2013/0011042 A1 | 1/2013 | Satish et al. |
| 2013/0094996 A1 | 4/2013 | Janssenswillen |
| 2013/0170729 A1 | 7/2013 | Wardlaw et al. |
| 2013/0188040 A1 | 7/2013 | Kamen et al. |
| 2013/0303870 A1 | 11/2013 | Satish et al. |
| 2014/0020449 A1 | 1/2014 | Ito |
| 2014/0207091 A1 | 7/2014 | Heagle et al. |
| 2014/0318639 A1 | 10/2014 | Peret et al. |
| 2014/0330094 A1 | 11/2014 | Pacione et al. |
| 2015/0335308 A1 | 11/2015 | Pedrizzetti |
| 2016/0027173 A1 | 1/2016 | Satish et al. |
| 2016/0115395 A1 | 4/2016 | Rustad et al. |
| 2016/0292866 A1 | 10/2016 | Bloom |
| 2016/0312553 A1 | 10/2016 | Zhao |
| 2016/0331282 A1 | 11/2016 | Satish et al. |
| 2017/0185739 A1 | 6/2017 | Gomez et al. |
| 2017/0351894 A1 | 12/2017 | Satish et al. |
| 2017/0352152 A1 | 12/2017 | Satish et al. |
| 2018/0028079 A1* | 2/2018 | Gurevich ............ A61B 5/0261 |
| 2018/0199827 A1 | 7/2018 | Satish et al. |
| 2019/0008427 A1 | 1/2019 | Satish et al. |
| 2019/0120673 A1 | 4/2019 | Cooksey et al. |
| 2020/0104560 A1 | 4/2020 | Satish et al. |
| 2020/0113451 A1 | 4/2020 | Satish et al. |
| 2020/0232841 A1 | 7/2020 | Satish et al. |
| 2020/0258229 A1 | 8/2020 | Satish et al. |
| 2020/0311935 A1 | 10/2020 | Satish et al. |
| 2020/0380684 A1 | 12/2020 | Satish et al. |
| 2021/0059584 A1 | 3/2021 | Satish et al. |
| 2021/0192917 A1 | 6/2021 | Satish et al. |
| 2021/0236227 A1 | 8/2021 | Kumar et al. |
| 2021/0353383 A1 | 11/2021 | Kumar et al. |

FOREIGN PATENT DOCUMENTS

| | | |
|---|---|---|
| CN | 101505813 A | 8/2009 |
| JP | S59161801 U | 10/1984 |
| JP | S61176357 A | 8/1986 |
| JP | 562144652 U | 9/1987 |
| JP | H06510210 A | 11/1994 |
| JP | H07308312 A | 11/1995 |
| JP | H1137845 A | 2/1999 |
| JP | 2000227390 A | 8/2000 |
| JP | 2002331031 A | 11/2002 |
| JP | 2003075436 A | 3/2003 |
| JP | 2005052288 A | 3/2005 |
| JP | 3701031 B2 | 9/2005 |
| JP | 2006280445 A | 10/2006 |
| JP | 2008055142 A | 3/2008 |
| JP | 2008519604 A | 6/2008 |
| JP | 2010516429 A | 5/2010 |
| JP | 2011036371 A | 2/2011 |
| JP | 2011515681 A | 5/2011 |
| JP | 2011252804 A | 12/2011 |
| WO | 9217787 A1 | 10/1992 |
| WO | 9639927 A1 | 12/1996 |
| WO | 2006053208 A1 | 5/2006 |
| WO | 2008094703 A2 | 8/2008 |
| WO | 2009117652 A1 | 9/2009 |
| WO | 2011019576 A1 | 2/2011 |
| WO | 2011145351 A1 | 11/2011 |
| WO | 2013009709 A2 | 1/2013 |
| WO | 2013172874 A1 | 11/2013 |
| WO | 2013173356 A1 | 11/2013 |
| WO | 2016187072 A1 | 11/2016 |
| WO | 2018125812 A1 | 7/2018 |
| WO | 2020069278 A1 | 4/2020 |
| WO | 2020081435 A1 | 4/2020 |
| WO | 2020247258 A1 | 12/2020 |
| WO | 2021003130 A1 | 1/2021 |

OTHER PUBLICATIONS

Bellad, M.B. et al. (2009). "Standardized Visual Estimation of Blood Loss during Vaginal Delivery with Its Correlation Hematocrit Changes—A Descriptive Study." South Asian Federation of Obstetrics and Gynecology 1:29-34.

Extended European Search Report dated Apr. 1, 2015, for EP Application No. 12 810 640.8, filed on Jul. 9, 2012, 8 pages.

Extended European Search Report dated Nov. 17, 2015, for EP Application No. 13 790 449.6, filed on Jan. 10, 2013, 8 pages.

Extended European Search Report dated Nov. 23, 2015, for EP Application No. 13 790 688.9, filed on May 14, 2013, 9 pages.

Extended European Search Report dated Nov. 4, 2016, for EP Application No. 16 183 350.4, filed on Jul. 9, 2012, 9 pages.

Final Office Action dated Aug. 26, 2016, for U.S. Appl. No. 13/894,054, filed May 14, 2013, 7 pages.

Final Office Action dated Feb. 12, 2016, for U.S. Appl. No. 13/544,664, filed Jul. 9, 2012, 9 pages.

Final Office Action dated Jul. 26, 2016, for U.S. Appl. No. 14/876,628, filed Oct. 6, 2015, 5 pages.

International Application Serial No. PCT US2016 032564, International Preliminary Report on Patentablity dated Nov. 30, 2017, 6 pgs.

International Search Report dated Aug. 25, 2016, for PCT Application No. PCT/US2016/032564, filed on May 13, 2016, 2 pages.

International Search Report dated Mar. 26, 2013, for PCT Application No. PCT/US2013/021075, filed on Jan. 10, 2013, 2 pages.

International Search Report dated Sep. 17, 2012, for PCT Application No. PCT/US2012/045969, filed on Jul. 9, 2012, 2 pages.

International Search Report dated Sep. 24, 2013, for PCT Application No. PCT/US2013/040976, filed on May 14, 2013, 2 pages.

Kamiyoshihara, M. et al. (2008). "The Utility of an Autologous Blood Salvage System in Emergency Thoracotomy for a Hemothorax After Chest Trauma," Gen. Thorac. Cardiovasc. Surg. 56:222.

(56) References Cited

OTHER PUBLICATIONS

Non-Final Office Action dated Apr. 11, 2018, for U.S. Appl. No. 15/416,986, filed Jan. 26, 2017, 7 pages.
Non-Final Office Action dated Apr. 20, 2017, for U.S. Appl. No. 13/894,054, filed May 14, 2013, 7 pages.
Non-Final Office Action dated Aug. 13, 2015, for U.S. Appl. No. 13/544,664, filed Jul. 9, 2012, 8 pages.
Non-Final Office Action dated Aug. 2, 2016, for U.S. Appl. No. 13/544,664, filed Jul. 9, 2012, 6 pages.
Non-Final Office Action dated Dec. 15, 2015, for U.S. Appl. No. 14/876,628, filed Oct. 6, 2015, 8 pages.
Non-Final Office Action dated Feb. 21, 2019, for U.S. Appl. No. 15/594,017, filed May 12, 2017, 23 pages.
Non-Final Office Action dated Mar. 20, 2015, for U.S. Appl. No. 14/613,807, filed Feb. 4, 2015, 8 pages.
Non-Final Office Action dated Mar. 30, 2016, for U.S. Appl. No. 13/894,054, filed May 14, 2013, 9 pages.
Non-Final Office Action dated May 9, 2014, for U.S. Appl. No. 13/544,679, filed Jul. 9, 2012, 7 pages.
Non-Final Office Action dated Sep. 5, 2014, for U.S. Appl. No. 13/738,919, filed Jan. 10, 2013, 8 pages.
Notice of Allowance dated Feb. 15, 2017, for U.S. Appl. No. 13/544,664, filed Jul. 9, 2012, 10 pages.
Notice of Allowance dated Jan. 24, 2019, for U.S. Appl. No. 15/416,986, filed Jan. 26, 2017, 8 pages.
Notice of Allowance dated Jun. 25, 2015, for U.S. Appl. No. 14/613,807, filed Feb. 4, 2015, 10 pages.
Notice of Allowance dated May 12, 2014, for U.S. Appl. No. 13/544,646, filed Jul. 9, 2012, 10 pages.
Notice of Allowance dated Nov. 10, 2014, for U.S. Appl. No. 13/738,919, filed Jan. 10, 2013, 10 pages.
Notice of Allowance dated Nov. 20, 2017, for U.S. Appl. No. 13/894,054, filed May 14, 2013, 8 pages.
Notice of Allowance dated Oct. 26, 2016, for U.S. Appl. No. 14/876,628, filed Oct. 6, 2015, 11 pages.
Notice of Allowance dated Sep. 3, 2014, for U.S. Appl. No. 13/544,679, filed Jul. 9, 2012, 8 pages.
Pogorelc, D. iPads in the OR: New Mobile Platform to Monitor Blood Loss During Surgery. MedCityNews, Jun. 6, 2012. http://medcitynews.com/2012/06/ipads-in-the-or-new-mobile-platform-to-mon-itor-blood-loss-during-surgery, 4 pages.
Sant et al. (2012). "Exsanguinated Blood Volume Estimation Using Fractal Analysis of Digital Images," Journal of Forensic Sciences 57:610-617.
U.S. Appl. No. 15/416,986, filed Jan. 26, 2017, by Satish et al.
U.S. Appl. No. 15/594,017, filed May 12, 2017, by Satish et al.
U.S. Appl. No. 15/943,561, filed Apr. 2, 2018, by Satish et al.
Written Opinion of the International Searching Authority dated Aug. 25, 2016, for PCT Application No. PCT/US2016/032564, filed on May 13, 2016, 4 pages.
Written Opinion of the International Searching Authority dated Mar. 26, 2013, for PCT Application No. PCT/US2013/021075, filed on Jan. 10, 2013, 6 pages.
Written Opinion of the International Searching Authority dated Sep. 17, 2012, for PCT Application No. PCT/US2012/045969, filed on Jul. 9, 2012, 4 pages.
Written Opinion of the International Searching Authority dated Sep. 24, 2013, for PCT Application No. PCT/US2013/040976, filed May 14, 2013, 4 pages.

* cited by examiner

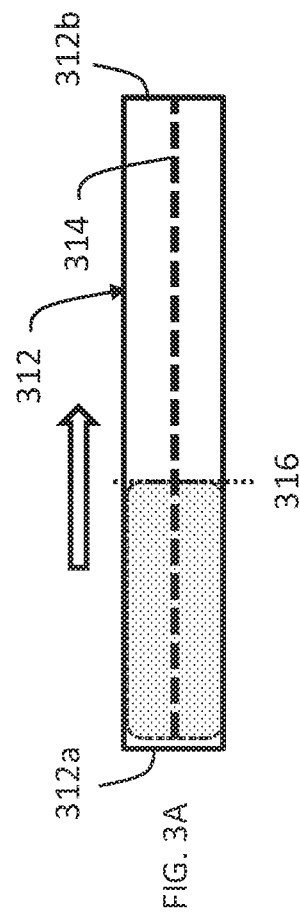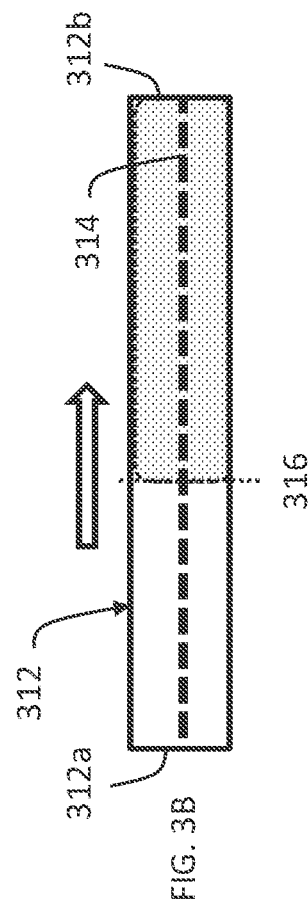

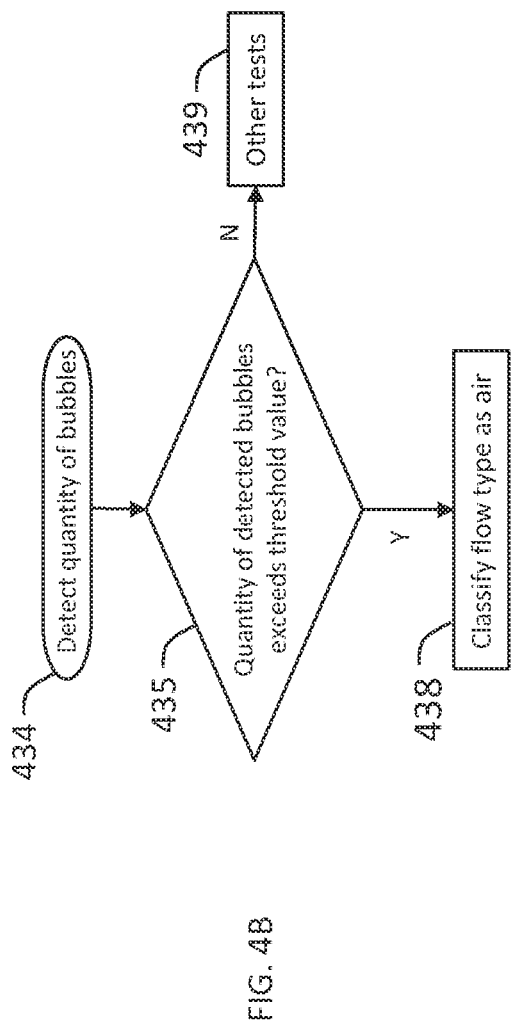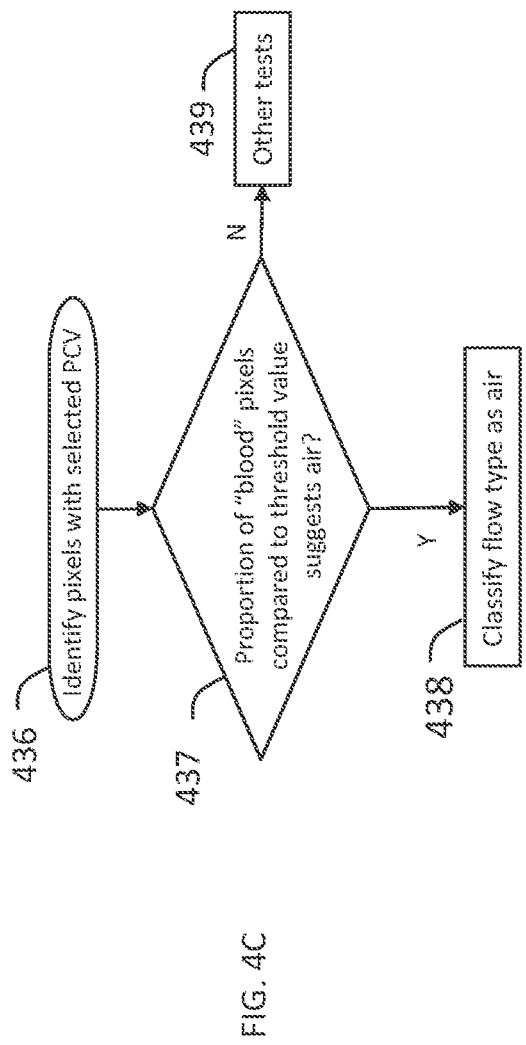
FIG. 4B
FIG. 4C

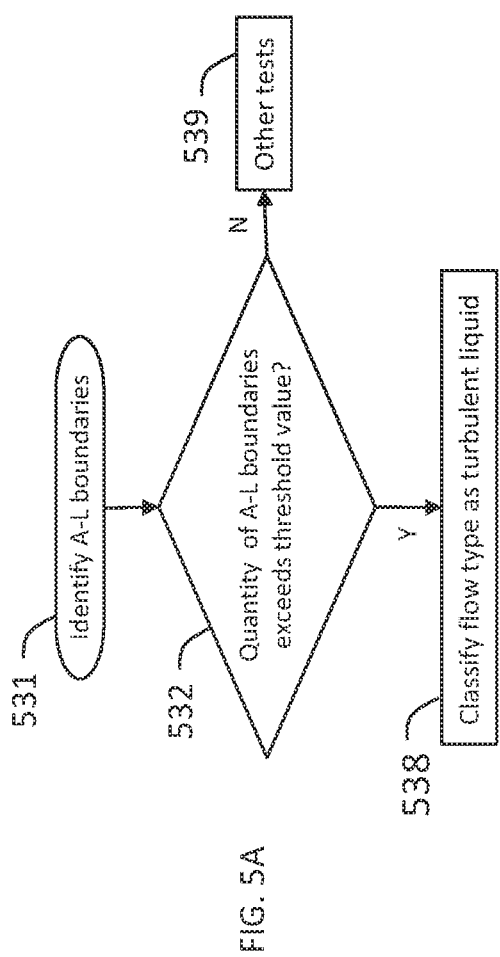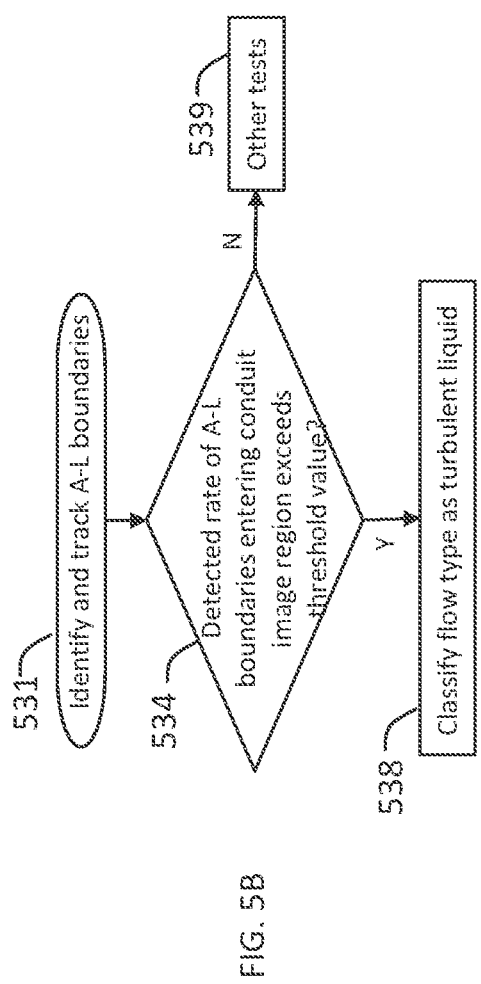

CONTINUOUS FLOW

BACK FLOW

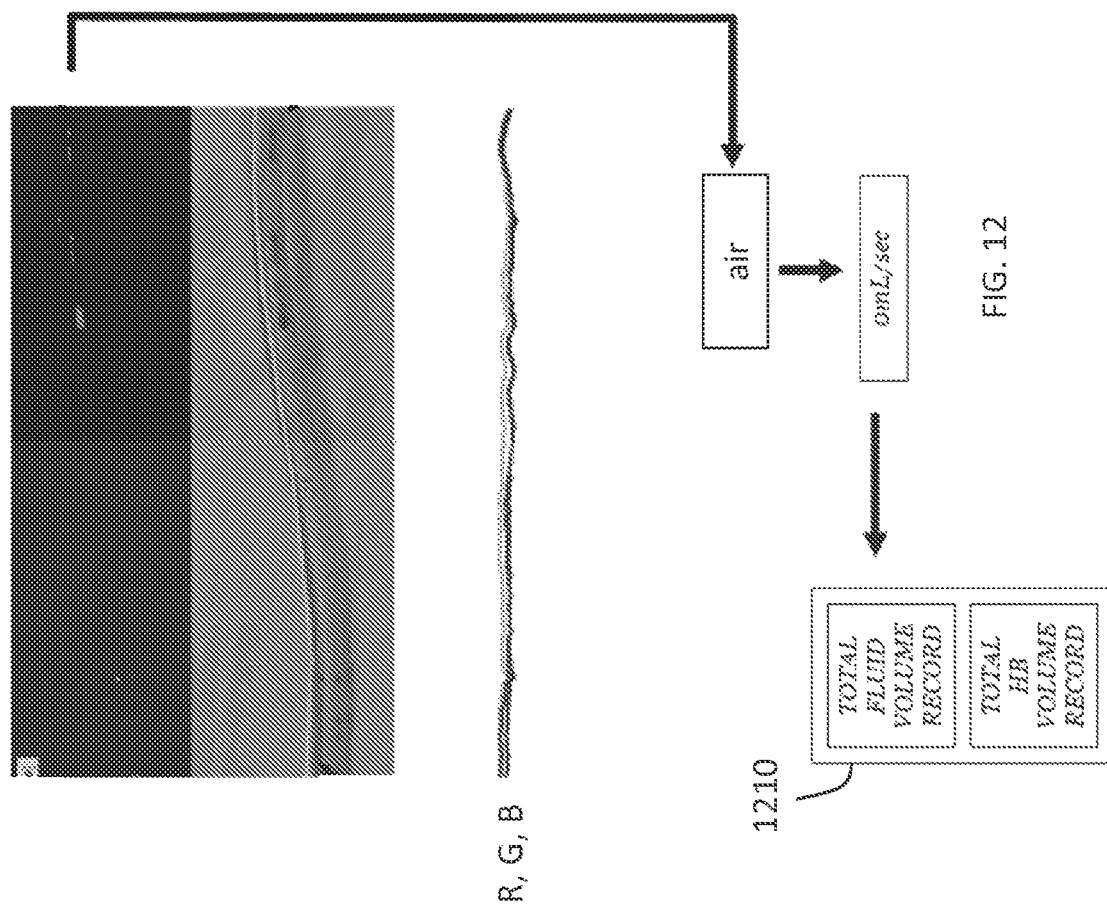

METHODS AND SYSTEMS FOR CHARACTERIZING FLUIDS FROM A PATIENT

CROSS-REFERENCE TO RELATED APPLICATIONS

This is a continuation of U.S. application Ser. No. 16/986,771, filed on Aug. 6, 2020, which is a continuation of U.S. application Ser. No. 15/154,929, filed on May 13, 2016, now U.S. Pat. No. 10,789,710, which claims priority to and all the benefits of U.S. Provisional Patent Application No. 62/232,255, filed Sep. 24, 2015, and U.S. Provisional Patent Application No. 62/162,154, filed on May 15, 2015, the entire contents of each being hereby incorporated by reference.

BACKGROUND OF THE INVENTION

Inaccurate estimation of fluid loss (e.g., blood) from a patient, such as during a surgical procedure, may put the patient's health at risk. For example, overestimation of patient blood loss results in the unnecessary consumption of transfusion-grade blood, and may lead to shortages of transfusion-grade blood that is needed for other patients. As another example, underestimation of patient blood loss may lead to delayed resuscitation and transfusion, increased risk of infections, tissue death, or even patient death, such as in the event of hemorrhage.

Furthermore, inaccurate estimation may be a significant contributor to high operating and surgical costs for hospitals, clinics, and other medical facilities. In particular, unnecessary blood transfusions, resulting from overestimation of patient blood loss, lead to higher operating costs for medical institutions. Additionally, delayed blood transfusions, resulting from underestimation of patient blood loss, have been associated with billions of dollars in avoidable patient infections and re-hospitalizations annually. Thus, it is desirable to have more accurate systems and methods for characterizing fluids from a patient.

BRIEF SUMMARY OF THE INVENTION

Described herein are methods and systems for characterizing fluids from a patient. Generally, in one variation, a computer-implemented method for characterizing fluids from a patient comprises: receiving a time series of images of a conduit receiving fluids from the patient, identifying a conduit image region in each of the images, classifying a flow type through the conduit based on an evaluation of the conduit image region in the time series of images, and estimating a volume of fluids that has passed through the conduit within a predetermined period of time, based at least in part on the classification of the flow type. An estimated volume of fluids that has passed through the conduit may be based at least in part on an estimated volumetric flow rate and the predetermined period of time. Additionally, the method may further include estimating a concentration of a blood component in the estimated volume of fluids based on at least one pixel color value in the conduit image region. A quantity of the blood component that has passed through the conduit may subsequently be estimated based at least in part on the estimated volume of fluids and the estimated concentration of the blood component.

In some variations, the flow type may be classified as air, laminar liquid, or turbulent liquid. For example, to classify the flow type as air or laminar liquid, the method may include detecting a color change across at least one air-liquid boundary in the conduit image region and classifying the flow type as air or laminar liquid based on the detected color change. As another example, to classify the flow type as air, the method may include detecting a quantity of bubbles in the conduit image region and classifying the flow type as air if the quantity of bubbles exceeds a predetermined threshold value. As yet another example of classifying the flow type as air, the method may include detecting a quantity of pixels in the conduit image region that have one or more predetermined pixel color values, and classifying the flow type as air based on a comparison between the quantity of pixels and a predetermined threshold value. In contrast, to classify the flow as turbulent liquid, the method may include assessing one or more air-liquid boundaries entering the conduit image region throughout at least a portion of the time series of images, and classifying the flow type as turbulent liquid if the detected rate exceeds a predetermined threshold.

The process for estimating volumetric flow rate through the conduit may depend on how the flow type has been classified. For instance, if the flow type is classified as laminar liquid, the volumetric flow rate through the conduit may be estimated by estimating a total volumetric flow rate in the conduit and determining a proportion of the total volumetric flow associated with liquid. For instance, estimating the total volumetric flow rate in the conduit comprises tracking one or more pixels (e.g., one or more air-liquid boundaries) within the conduit image region throughout at least a portion of the time series of images. Additionally, the proportion of the total volumetric flow rate associated with liquid may involve evaluating one or more pixel color values in the conduit image region.

Furthermore, if the flow type is classified as turbulent liquid, the volumetric flow rate through the conduit may be estimated by integrating a predetermined static volumetric flow rate over a turbulent period of time.

The time series of images may be generated and adjusted in any suitable manner. For instance, the time series may be generated with use of a camera. Additionally, the conduit may have particular characteristics to make fluid within the conduit more easily imaged. For instance, the conduit may have a generally flattened shape, or a region configured to contain a slowed volume of fluids received by the conduit. Additionally, the conduit may include an optical fiducial, such as a color fiducial that permits normalization of the images to a standard scale of pixel color values.

Furthermore, generally, a system for characterizing fluids from a patient may include a processor configured to: receive a time series of images of a conduit receiving fluids from the patient, identify a conduit image region in each of the images, classify a flow type through the conduit based on an evaluation of the conduit image region in the time series of images, and estimate a volume of fluids that has passed through the conduit within a predetermined period of time, based at least in part on the classification of the flow type.

The processor may be configured to estimate a volume of fluids that has passed through the conduit based at least in part on an estimated volumetric flow rate and the predetermined period of time. Additionally, the processor may be configured to estimate a concentration of a blood component in the estimated volume of fluids based on at least one pixel color value in the conduit image region. Furthermore, the processor may build upon previous estimates in order to, for example, estimate a quantity of the blood component that has passed through the conduit, based at least in part on the estimated volume of fluids and the estimated concentration of the blood component.

Although other classifications may also be appropriate, in one variation, the processor may be configured to classify the flow type as air, laminar liquid, or turbulent liquid. As discussed previously, the process for estimating volumetric flow rate may depend on how the flow type has been classified. For example, if the flow type is classified as laminar liquid, the processor may be configured to estimate a volumetric flow rate of fluids from the patient in the conduit by estimating a total volumetric flow rate in the conduit and determine a proportion of the total volumetric flow rate associated with liquid. In contrast, if the flow type is classified as turbulent liquid, the processor may be configured to estimate a volumetric flow rate of fluids from the patient in the conduit by integrating a predetermined static volumetric flow rate over a turbulent period of time.

BRIEF DESCRIPTION OF THE DRAWINGS

FIGS. 3A and 3B are illustrative schematics of different types of air-liquid boundaries.

FIGS. 4A-4C are flowcharts summarizing variations of classifying flow type through a conduit as air.

FIGS. 5A-5B are flowcharts summarizing variations of classifying flow type through a conduit as turbulent liquid.

FIG. 12 depicts exemplary characteristics of "air" flow type classification.

DETAILED DESCRIPTION OF THE INVENTION

Examples of various aspects and variations of the invention are described herein and illustrated in the accompanying drawings. The following description of the embodiments of the invention is not intended to limit the invention to these embodiments, but rather to enable a person skilled in the art to make and use this invention.

I. Methods and Systems Overview

Generally, the methods and systems described herein for characterizing fluids from a patient are used to assess fluids that are lost by a patient during a surgical procedure. For example, the methods and systems may be used to track or otherwise estimate, based on a time series of images of fluid collected from a patient, a quantity of fluid (e.g., blood) lost by the patient during the surgical procedure. In other examples, the methods and systems may additionally or alternatively be used to track or otherwise assess total mass, total volume, and/or aggregate concentration of red blood cells, whole blood (e.g., estimated blood loss), platelets, plasma, and/or other blood components lost by the patient during the surgical procedure. These estimates, and other fluid-related information described in further detail below, may be updated and displayed in substantially real-time during the surgical procedure and/or at the conclusion of the surgical procedure.

The methods and systems described herein may be used in a variety of settings, including in a hospital or clinic setting (e.g., operating or clinic setting), a military setting (e.g., battlefield) or other suitable medical treatment settings. This information can be used to improve medical treatment of patients, as well as reduce costs to medical institutions and patients. For instance, medical practitioners (e.g., nurses, surgeons) who receive this information during and/or after a surgical procedure can then make appropriate decisions for treatment of the patient (such as determining whether to provide a blood transfusion to the patient and how much blood is necessary) based on more accurate information on patient status. In particular, with more accurate information on the patient fluid loss, practitioners can, for example, avoid providing unnecessary blood transfusions (which deplete inventory of blood transfusions and increase operating costs and medical bills), while also avoiding delayed blood transfusions (which would risk patient health).

Figure 1:
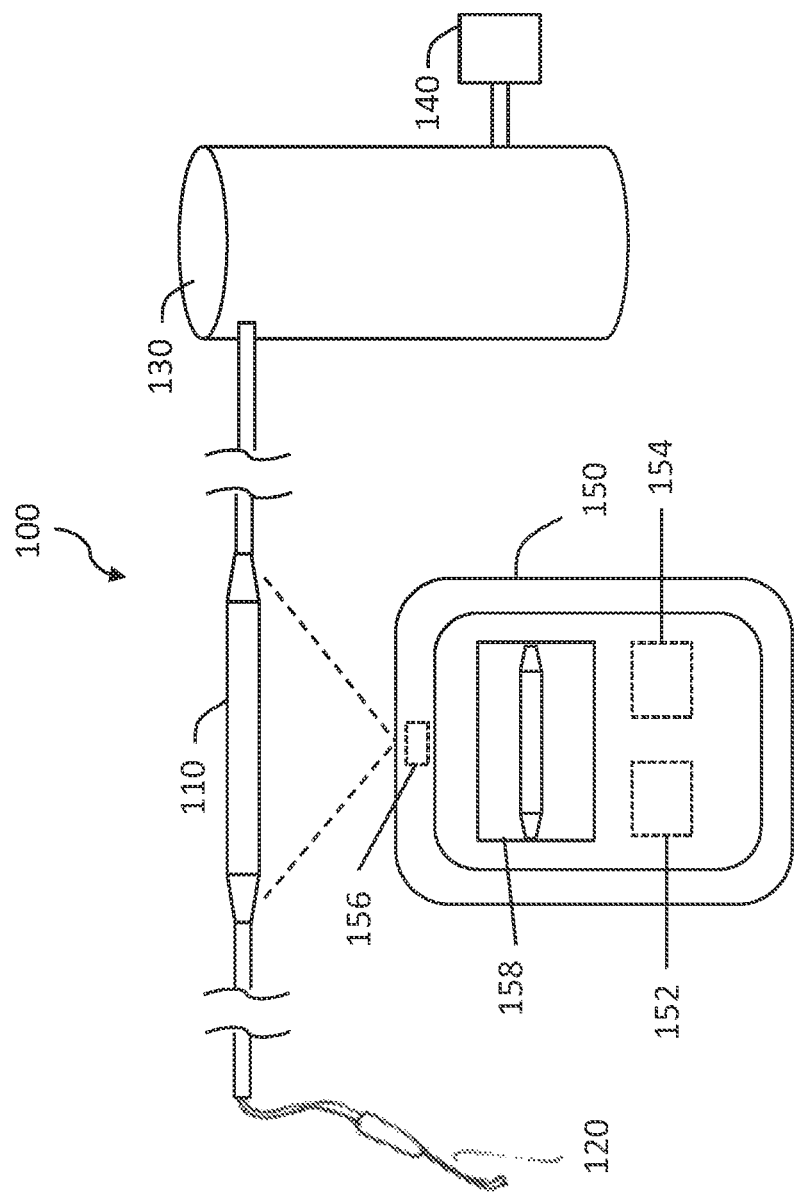
FIG. 1 is a schematic of one variation of the system for characterizing fluids from a patient.

During a surgical procedure, patient fluids may be collected and passed into a conduit, where the fluids are imaged for assessment purposes, then subsequently directed into another receptacle such as a sealed waste management system. For example, as shown in FIG. 1, a fluid retrieval device 120 (e.g., suction wand) or other source of patient fluids may collect patient fluids from a surgical site, a canister, a surgical textile, and/or other fluid source containing fluids to be assessed. The collected patient fluids may be passed via tubing into a conduit 110, and may continue to flow into a receptacle 130 (e.g., canister or sealed waste management system). In other words, the conduit 110 may be placed in fluidic communication with the fluid retrieval device 120 (or other fluid source) and the receptacle 130. In such an "in-line" arrangement, the conduit 110 receives patient fluids from the fluid retrieval device 120 or other fluid source, and subsequently delivers the same patient fluids into the receptacle 130. In some variations, the conduit 110 and and/or fluid retrieval device 120 may be in fluidic communication with a vacuum source (e.g., a vacuum pump 140 provided by receptacle 130) configured to provide suction to the fluid retrieval device 120 for collecting fluids. In some of these variations, the systems described herein can be inserted into preexisting setups with waste management systems that collect patient fluids, without the need for extensive equipment additions or modifications.

A series or sequence of images (e.g., optical photographic images) that capture the patient fluids flowing through the conduit may be generated during the surgical procedure. For example, as shown in FIG. 1, in one variation, such a time series of images may be generated by a handheld or mobile device 150 (e.g., tablet computer, mobile smartphone, etc.) equipped with a camera 156 and placed near the conduit. Analyzing the time series of images, using the methods described herein, may provide insight into qualities and characteristics of the patient fluids that are lost. Furthermore, when substantially all lost patient fluids are collected and passed into the conduit, analyzing the series of images may enable accurate quantification of the total fluids and/or blood components that are lost by the patient.

The methods described herein may be computer-implemented and performed at least in part by one or more processors. For example, as shown in FIG. 1, in one variation, the method may be performed at least in part by a computer device such as the mobile device 150 that is capturing the time series of images in the operating room. However, the method may be performed by one or more processors that are separate from the mobile device 150 (e.g., on-site in the operating room or remotely outside the operating room). Other aspects of variations of methods and systems for characterizing fluids from a patient are described in further detail below.

II. Methods for Characterizing Fluids from a Patient

Figure 2:
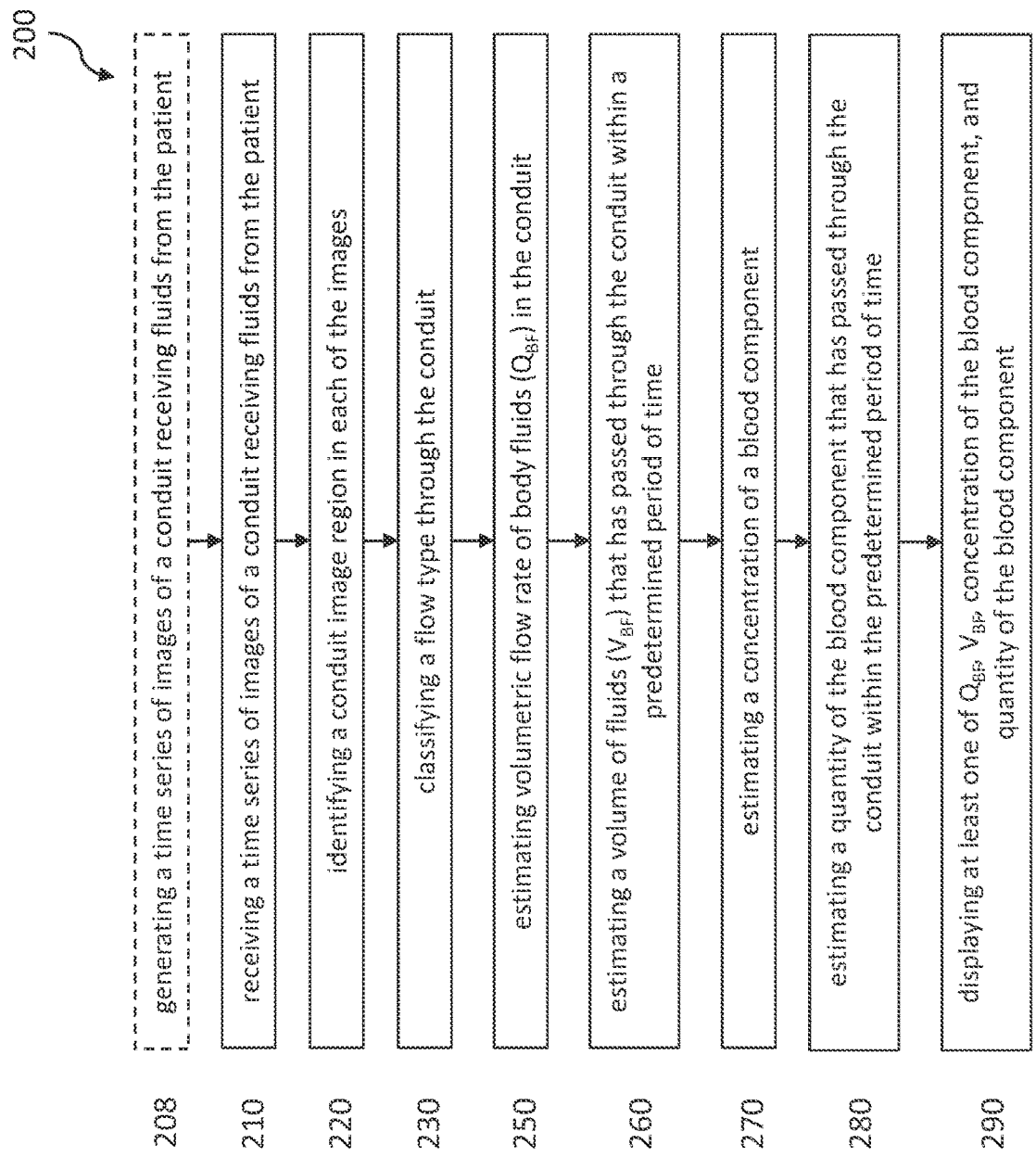
FIG. 2 is a flowchart summarizing one variation of a method for characterizing fluids from a patient.

As shown in FIG. 2, an example of a method 200 for characterizing fluids from a patient may include: receiving a time series of images of a conduit receiving fluids from the patient 210, identifying a conduit image region in each of the images 220, and classifying a flow type through the conduit 230 based on an evaluation of the conduit image region in the time series of images. In some variations, the method may include generating the time series of images of a conduit receiving fluids from the patient 208 for evaluation. In some variations, the method 200 may include estimating volumetric flow rate of fluids in the conduit 250 based at least in part on the classification of the flow type. The method may additionally include estimating other fluid-related metrics, such as estimating a volume of fluids that has passed into or through the conduit within a predetermined period of time 260 and estimating a concentration of a blood component in the estimated volume of fluids 270. Additionally, the method may include estimating a quantity of a blood component that has passed through the conduit within the predetermined time 280. Furthermore, the method may further include displaying at least one of the estimated volumetric flow rate of body fluids in the conduit, estimated volume of fluids that has passed through the conduit within a predetermined period of time, estimated concentration of a blood component, and estimated quantity of a blood component 290.

Time Series of Images

In some variations, the method 200 may include generating a time series of images of a conduit receiving fluids from the patient 208. The images may include optical images captured in sequence over time as fluids pass through the conduit, such as in a video sequence of images. The images may capture substantially the entire conduit, or only a selected portion of the conduit as fluids from the patient enter and pass through the conduit. Some or all of these images may subsequently be provided to a processor and/or a database that stores the time series of images.

In some variations, the method 200 includes receiving a time series of images of a conduit receiving fluids from the patient 210. The time series of images may be generated with a camera as described above, and/or received from the camera or a database storing the time series of images.

In some variations, after receiving the time series of images, the method 200 may include processing the time series of images. Processing the images may include spatially aligning the images to one another. Such spatial alignment can compensate for movement of the conduit and/or the camera that captures the images. Spatially aligning the image may include, for example, identifying one or more optical fiducials on the conduit in each image and adjusting one or images to spatially correlate the identified optical fiducials in the time series of images. As another example, spatially aligning the image may include identifying one or more edges of the conduit in each image and adjusting one or more images to spatially correlate corresponding edge or edges of the conduit in the time series of images. However, other suitable image registration or image alignment algorithms (e.g., intensity-based algorithms, other feature-based algorithms, etc.) may be employed in order to spatially align images in the time series of images.

Processing the time series of images may additionally or alternatively include normalizing the color characteristics of the time series of images based on a set of one or more optical fiducials (e.g., a color fiducial). The color fiducial may be associated with the conduit (e.g., coupled to or integral with the conduit or the packaging of the conduit), and may be associated with color-related information. For instance, the color fiducial may represent one or more red hues (e.g., a grid including boxes of different red hues). Normalization of the time series of images may utilize the color fiducial, such as to compensate for variations in lighting conditions throughout an operation, to artificially match lighting conditions of the conduit and lighting conditions of a template conduit, and/or to artificially match lighting conditions of the conduit and light condition-dependent blood component concentration models. For example, normalizing the time series of images may include identifying a color fiducial captured in the images, determining an assigned color value associated with the identified color fiducial, and adjusting the images such that the color value of the color fiducial in the images substantially matches the assigned color value associated with the color fiducial. The assigned color value can, for example, be determined by looking up the color fiducial in a database (e.g., identified by code, position within a set of color fiducials, position relative to a known feature of the conduit, etc.). Adjustments to the time series of images can include, for example, adjustment of exposure, contrast, saturation, temperature, tint, etc. The method 200, as further described below, can subsequently proceed using at least some of the adjusted time series of images.

In some variations, the method 200 may include retrieving conduit-related information associated with one or more optical fiducials and associating the time series of images with the conduit-related information. The optical fiducial may be associated with the conduit (e.g., coupled to or integral with the conduit or the packaging of the conduit), and be associated with conduit-related information. The optical fiducial may be scanned from the conduit or the time series of images or manually entered into settings for the image analysis, and be used to identify conduit-related information in a database. Additionally or alternatively, the conduit-related information may be manually entered (e.g., through the display screen). The conduit-related information may include, for instance, a type or classification of the conduit, geometry and/or dimensions of an internal volume of the conduit, a flow resistance of the conduit, etc. Retrieving conduit-related information may be performed before, after, or during generating or receiving the time series of images. Some or all of the conduit-related information may be used in analysis of the images in method 200, as described below. For example, dimensions (e.g., cross-sectional area) of the conduit may be used in transforming a volumetric flow rate within the conduit into a linear flow velocity within the conduit.

Conduit Image Region

In some variations, the method 200 includes identifying a conduit image region in each of the images 220. In some variations, the conduit image region may be generally rectangular, such that identifying the conduit image region in each of the images 220 may include identifying an inlet boundary, identifying an outlet boundary, and/or identifying one or more lateral boundaries that bound the conduit image region in the images. For example, as shown in FIGS. 3A and 3B, the conduit image region 312 may have an approximately rectangular shape generally aligned with the conduit path. In one variation, identifying the conduit image region may include applying an edge detection technique. In this variation, the distinction between the inlet boundary (corresponding to where fluid flows into the conduit image region) and outlet boundary (corresponding to where fluid flows out of the conduit image region) may based on, for example, an assumption that fluid flows from left to right or vice versa, or a flow direction indicator located on or near a surface of the conduit.

In another variation, identifying a conduit image region in each of the images 220 may include generating a linear function approximating a conduit path and identifying a conduit image region based on the conduit path. For instance, in each image, the conduit path can be modeled as a piecewise linear function, and the conduit image region can be modeled as an area aligned with and/or surrounding the conduit path. The piecewise linear function can be defined in terms of the points that are joined by the pieces of the piecewise linear function. Based on this type of function, candidate functions for the conduit path and associated candidate conduit image regions can be generated. To evaluate which candidate function best approximates the conduit path, a color-based segmentation algorithm can additionally be applied to generate a binary matrix of blood-color pixels (e.g., red pixels). Candidate functions can then be scored based on a weighted sum of differences between their associated candidate conduit image regions and the binary matrix of blood-color pixels. This approach may encourage the highest-scoring candidate function to have a tight, tube-like shape instead of overfitting to false positive pixels in the background (i.e., pixels that would be incorrectly determined as representing part of the conduit). The linear function approximating the conduit path may be periodically or intermittently updated by doing a local search for any higher-scoring candidate function approximating the conduit path in different images throughout the time series of images.

In another variation, identifying a conduit image region in each of the images 220 may involve applying template matching techniques and/or other machine vision techniques to identify the conduit image region boundaries.

In yet another variation, identifying a conduit image region in each of the images may include basing the conduit image region on user input. In particular, the user input may designate a portion of the display as the conduit image region. For example, a user may define boundaries of a conduit image region on a touchscreen display such as by touching the screen and dragging a window or frame to a size and location of a desired conduit image region, or touching the screen to place boundary markers at the corners or sides of a desired conduit image region. A user may similarly define boundaries of a desired conduit image region with a cursor controlled by a computer mouse or other input device, etc. The user-defined conduit image region may then be used a template for identifying the conduit image region in the time series of images.

Air-Liquid Boundaries

In some variations, the method 200 includes identifying one or more air-liquid boundaries in the conduit image region of each image. An air-liquid boundary may generally be represented by a change in pixel color values between adjacent pixels or pixel clusters in the conduit image region. In one variation, identifying one or more air-liquid boundaries may include an edge detection technique. For example, as shown in FIGS. 3A and 3B, a scan line 314 of predetermined width (e.g., ten pixels, twenty pixels, number of pixels spanning the width or diameter of the conduit image region, etc.) may be defined to extend longitudinally along the conduit path that was previously identified in the conduit image region 312. The scan line 314 may be aligned along a centerline of the conduit image region, or offset from the centerline of the conduit image region. Pixel color values or intensities (e.g., red, green, and/or blue (RGB) component values, etc.) can be measured at various points along the scan line 314, such as in a scanning manner (e.g., measured at every pixel or every other pixel). A change in pixel color value (or average pixel color values along the width of the scan line) across any point along the scan line 314 may indicate the presence of an air-liquid boundary 316 at that point. In particular, a pixel or pixel cluster having biased red pixel color values ("blood" pixels) may suggest the presence of blood or bloodied fluid, while a pixel or pixel cluster having approximately equal RGB pixel color values ("air" pixels) may suggest the presence of air. In some variations, each image can be scanned along the scan line 314 in the general direction of flow within the conduit, starting from the inlet boundary line 312a and ending at the outlet boundary line 312b or wherever an air-liquid boundary 316 is detected in the conduit image region. However, in other variations, each image can be scanned along the scan line 314 in other suitable directions.

In some variations, after identifying one or more air-liquid boundaries in a single image, the method 200 may further include tracking the identified air-liquid boundaries in one or more subsequent images and determining a rate of travel for the identified air-liquid boundaries. This tracking can include, for instance, measuring the length of each "air" region or "blood" region between consecutive air-liquid boundaries based on pixel color values in one image, and comparing these measured lengths to the lengths of each corresponding "air" region or "blood" region in one or more subsequent images. In this manner, for a particular image (representing a point in time in the time series of images), the method 200 can be used to identify which air-liquid boundaries have newly entered the portion of the conduit represented by the conduit image region, identify the location of each air-liquid boundary in the conduit image region, and/or identify which air-liquid boundaries have passed out of the portion of conduit represented by the conduit image region. Furthermore, the method 200 can be used determine the rate at which air-liquid boundaries are entering or passing through the conduit image region over a sequence of images or period of time.

In some variations, an air-liquid boundary may be classified based on the pattern of change in pixel color values between the upstream side of the air-liquid boundary 316 (closer to the inlet boundary 312a of the conduit image region) and downstream side of the air-liquid boundary (closer to the outlet boundary 312b of the conduit image region), at least along the scan line. For instance, as shown in FIG. 3A, an air-liquid boundary may be classified as "Type 1" if the upstream side of the air-liquid boundary generally includes "blood" pixels and the downstream side of the air-liquid boundary generally includes "air" pixels. A Type 1 air-liquid boundary may tend to indicate that blood or bloodied fluid is following air in the conduit at that air-liquid boundary. In contrast, as shown in FIG. 3B, an air-liquid boundary may be classified as "Type 2" if the upstream side of the air-liquid boundary generally includes "air" pixels and the downstream side of the air-liquid boundary generally includes "blood" pixels. A Type 2 air-liquid boundary may tend to indicate that air is following blood or bloodied fluid in the conduit at that air-liquid boundary.

Flow Types

In some variations, the method 200 includes classifying a flow type through the conduit based on an evaluation of the conduit image region in the time series of images 230. In some variations, the flow type in each image may be classified as air, turbulent liquid, or laminar liquid. In other variations, the flow type in each image may be classified as "mostly air" or "mostly liquid." In other variations, the flow type in each image may be classified as continuous/steady state flow in which the flow is primarily liquid without air, backflow in which bubbles form inside the tube as a result of the vacuum source losing suction, or start-up flow in which backflow transitions to continuous flow as a result of the vacuum source regaining suction. Any combination of these flow type classifications may be employed in order to classify the flow type in the conduit.

Flow Type Classification as "Air"

Figure 4A:
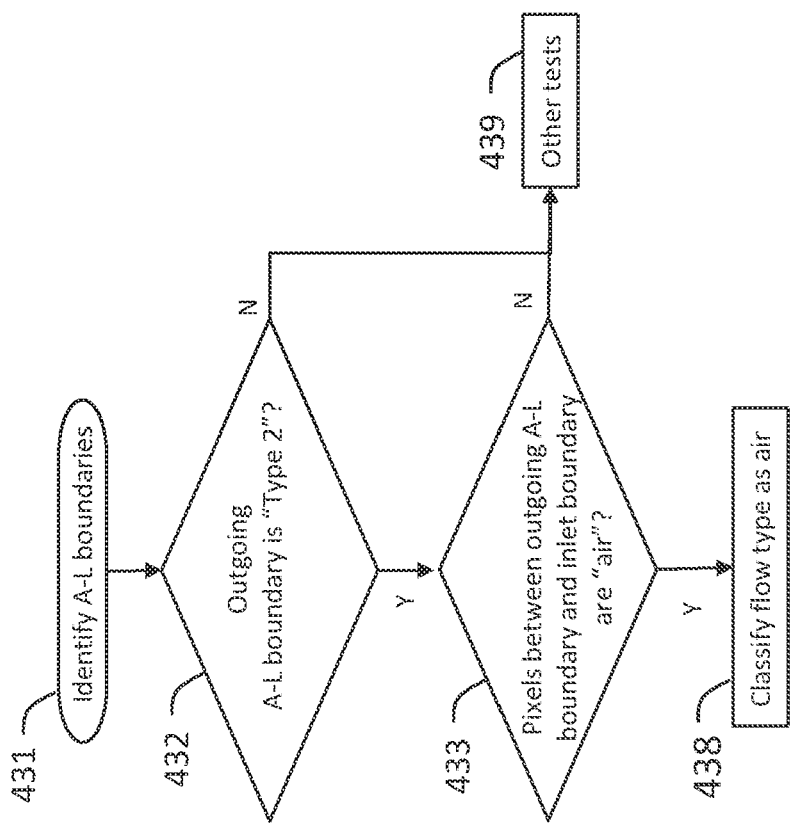

The flow type may be classified as air based on one or more tests. In one variation of classifying the flow type as air, classifying the flow type 230 may include detecting a color change across at least one air-liquid boundary in the conduit image region and classifying the flow type as air at least partially based on the detected color change. For instance, as shown in FIG. 4A, after identifying one or more air-liquid boundaries ("A-L boundaries") in the conduit image region (431), the air-liquid boundary that is closest to the outlet boundary (the "outgoing A-L boundary") may be considered (432). If the outgoing A-L boundary is Type 2 (i.e., suggesting that air is following blood or bloodied fluid in the conduit), and at least most of the pixel color values ("PCV") between the outgoing A-L boundary and the inlet boundary are generally typical of "air" pixels (433), then the flow type may be classified as air(438). For example, as shown in FIG. 12, a conduit including substantially air and substantially no blood or bloodied fluid will result in the conduit image region having substantially equal red (R), green (G) and blue (B) pixel color values, or "air" pixels, that are uniform along the conduit path. Otherwise, if the outgoing A-L boundary is not Type 2 and/or there are a substantial number of "blood" pixels between the outgoing A-L boundary and the inlet boundary, then, other classification tests may be performed (439) (e.g., other tests for classifying the flow type as air, tests for classifying the flow type as turbulent liquid, tests for classifying the flow type as laminar liquid, etc.).

In another variation of classifying the flow type as air, classifying the flow type 230 may include detecting a quantity of bubbles in the conduit image region and classifying the flow type as air if the quantity of bubbles exceeds a predetermined threshold value. For instance, as shown in FIG. 4B, the method may include detecting a quantity of bubbles (434). One exemplary algorithm for detecting bubbles includes generating a profile for the conduit image region based on a ratio of green and red color values (green intensity to red intensity, or red intensity to green intensity) for each pixel or pixel cluster along the conduit image region. This ratio for a particular pixel or pixel cluster provides a signal indicative of whether a corresponding part of the conduit contains blood (e.g., a ratio value of about 1 suggests that the pixel or pixel cluster is an "air" pixel or pixel cluster, and ratio values of other than 1 suggest that the pixel or pixel cluster is a "blood" pixel or pixel cluster). This profile may be smoothed with a smoothing filter (e.g., Gaussian smoothing filter) to reduce noise. The bubble-detection algorithm may then take the gradient of the smoothed profile (e.g., with the Laplacian-of-Gaussian) and identify gradient peaks (e.g., relative to a threshold), which indicate bubble edges. After detecting bubble edges in this manner, the bubbles may be quantified for comparison to a suitable predetermined threshold value (435). The representative quantity may be, for example, number of bubbles, total volume of bubbles, percentage volume of bubbles in the conduit image region, etc. If the threshold value is met or exceeded (435), then the flow type may be classified as air (438). Otherwise, if the quantity of detected bubbles does not meet the threshold value, then other classification tests may be performed (439).

In yet another variation of classifying the flow type as air, classifying the flow type 230 may include detecting a quantity of pixels in the conduit image region that have one or more predetermined pixel color values, and classifying the flow type as air based on a comparison between the quantity of pixels and a predetermined threshold value. For instance, as shown in FIG. 4C, the method may include identifying pixels and/or a proportion of pixels in the conduit image region having a selected pixel color value ("PCV") (436). The pixels with the selected PCV may, for example, be identified and/or quantified by applying a color-based segmentation algorithm to the color profile of the scan line or throughout the conduit image region. The proportion of pixels with the selected PCV may be compared to a predetermined threshold value (437). As additional illustration, the selected PCV may be biased red PCV, which indicates a "blood" pixel. The "blood" pixels may be identified and/or quantified (436) with a color-based blood segmentation algorithm, and the proportion of "blood" pixels in the conduit image region may be compared to a threshold value (437). If the proportion of "blood" pixels compared to a threshold value results in a suggestion that the conduit contains mostly air (e.g., is below a maximum blood pixel threshold value associated with a classification of air), then the flow type is classified as air (438). Otherwise, if the proportion of "blood" pixels relative to the threshold value does not suggest that the conduit contains mostly air, then other classification tests may be performed (439).

Flow Type Classification as Turbulent Liquid

The flow type may be classified as turbulent liquid based on one or more various tests. Some or all of these tests may be used in order to determine whether the flow type should be classified as turbulent liquid. In one variation of classifying the flow type as turbulent liquid, classifying the flow type 230 may include assessing one or more air-liquid boundaries in the conduit image region, and classifying the flow type as turbulent liquid based on the assessment of the one or more air-liquid boundaries compared to a predetermined threshold value. For instance, as shown in FIG. 5A, after identifying one or more air-liquid boundaries ("A-L boundaries") in the conduit image region (531), the quantity of air-liquid boundaries may be compared to a threshold value (532). If the quantity of air-liquid boundaries exceeds the threshold value (532), then the flow type may be classified as turbulent liquid (538). Otherwise, if the quantity of air-liquid boundaries does not exceed the threshold value, then other classification tests may be performed (539).

In another variation of classifying the flow type as turbulent liquid, classifying the flow type 230 may include detecting a rate of air-liquid boundaries entering the conduit image region throughout at least a portion of the time series of images, and classifying the flow type as turbulent liquid if the detected rate exceeds a predetermined threshold. For instance, as shown in FIG. 5B, the method may include identifying and tracking one or more A-L boundaries in the conduit image region (531) for a particular set of sequential images. This information may be converted into a detected rate at which A-L boundaries enter the conduit image region (e.g., crossing the inlet boundary) during the time period for the set of sequential images. The detected rate may be compared to a threshold value (534). If the detected rate exceeds a threshold value (534), then the flow type may be classified as turbulent liquid (538). Otherwise, if the detected rate of A-L boundaries does not exceed the threshold value, then other classification tests may be performed (539).

Figure 13:
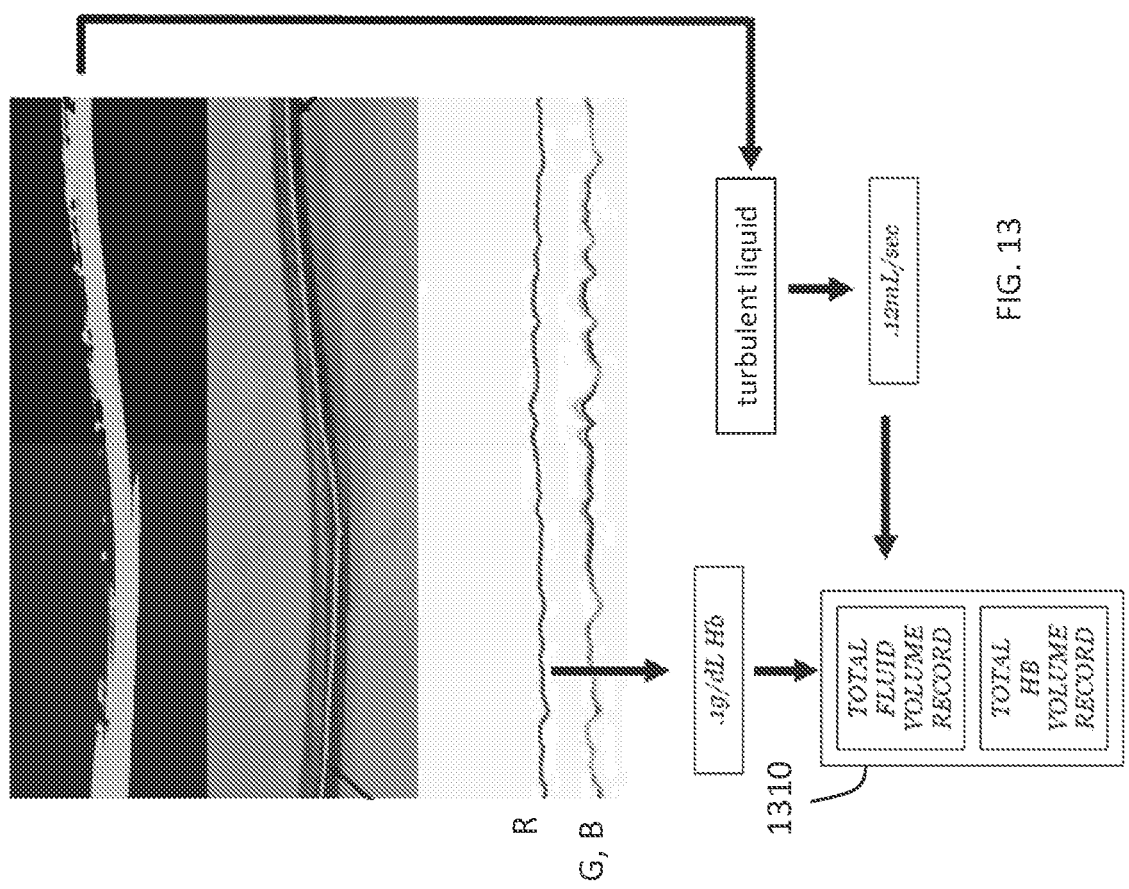
FIG. 13 depicts exemplary characteristics of "turbulent liquid" flow type classification.

In some variations, the relative intensities of red, green, and blue pixels may suggest a flow type classification of turbulent liquid. For example, as shown in FIG. 13, a conduit including blood or bloodied fluid will result in the conduit image region having higher red (R) pixel color values and lower green (G) and blue (B) pixel color values along the conduit path. However, additional information (e.g., relating to air-liquid boundaries) may be necessary to distinguish turbulent liquid from laminar liquid.

Flow Type Classification as Laminar Liquid

Figure 6:
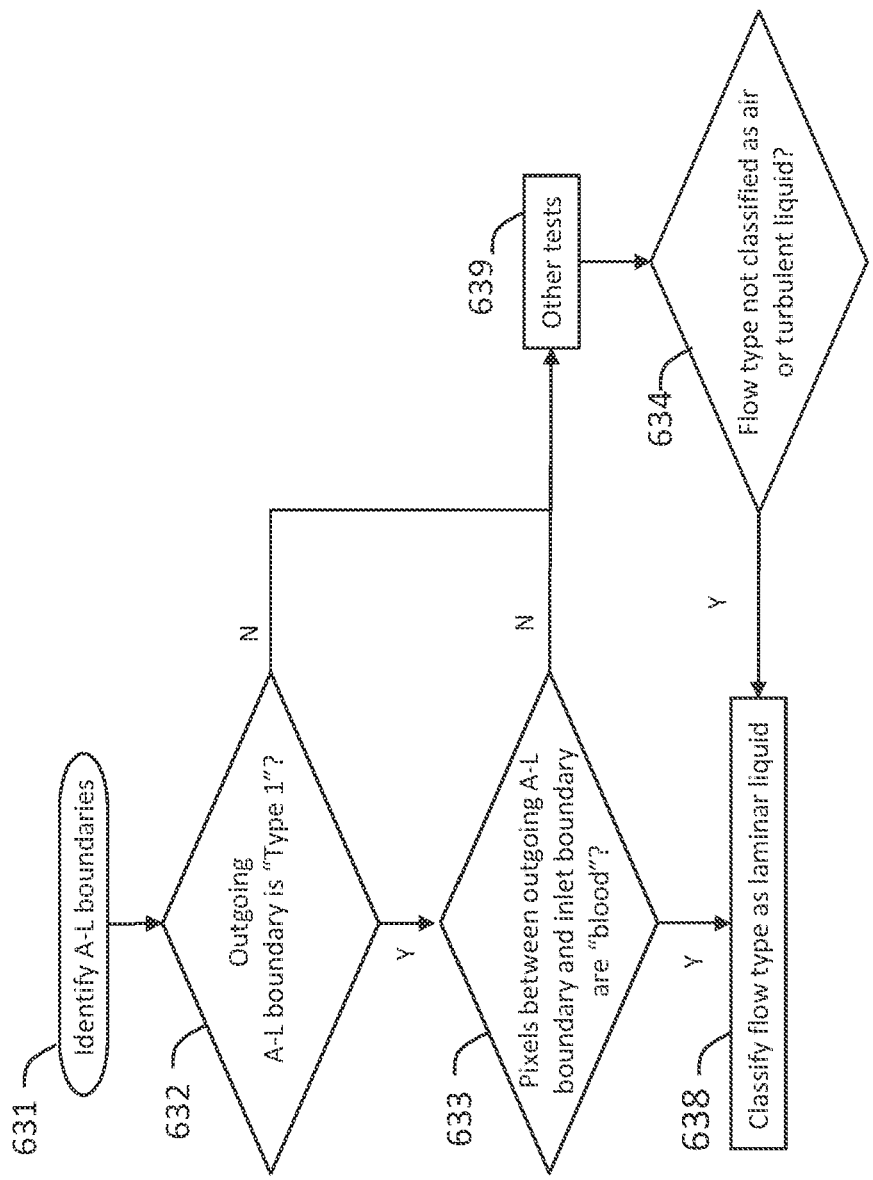
FIG. 6 is a flowchart summarizing one variation of classifying flow type through a conduit as laminar liquid.
Figure 14:
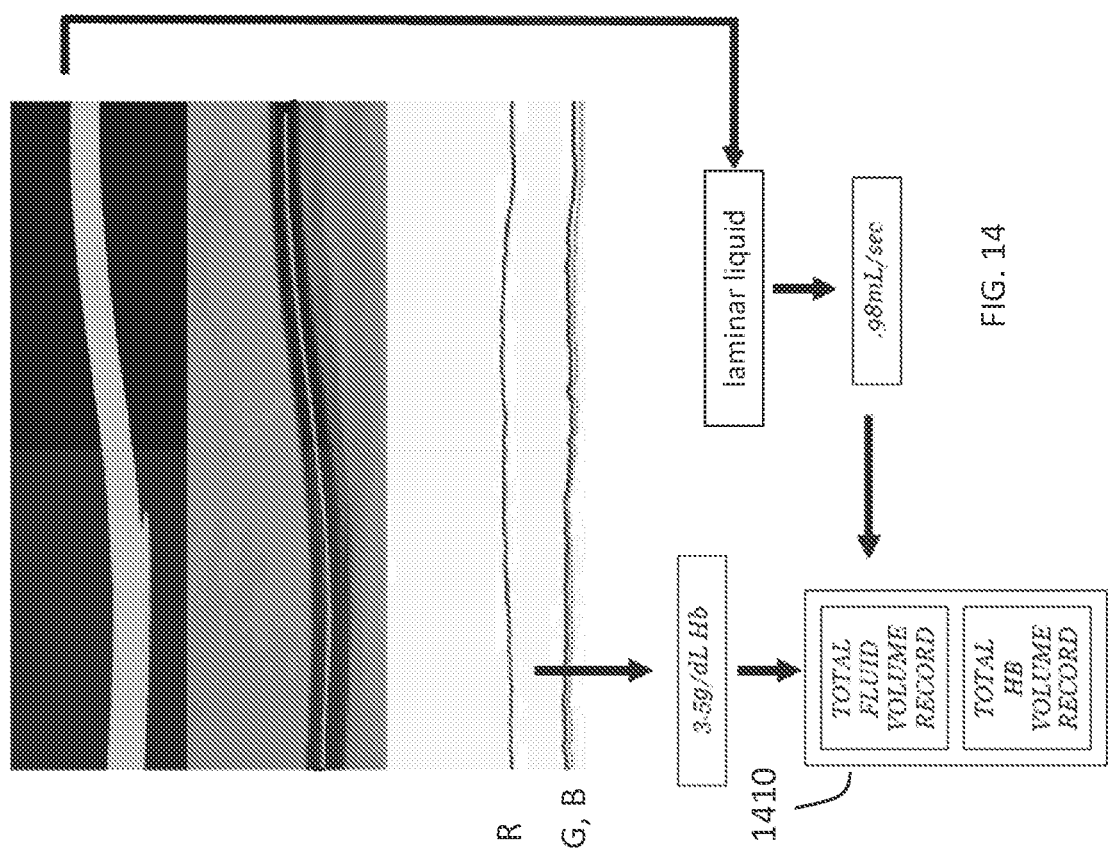
FIG. 14 depicts exemplary characteristics of "laminar liquid" flow type classification.

The flow type may be classified as laminar liquid based one or more various tests. In one variation of classifying the flow type as laminar liquid, classifying the flow type 230 may include detecting a color change across at least one air-liquid boundary in the conduit image region and classifying the flow type as laminar liquid based on the detected color change. For instance, as shown in FIG. 6, after identifying one or more A-L boundaries in the conduit image region (631), the A-L boundary that is closest to the outlet boundary (the "outgoing A-L boundary") may be considered (632). If the outgoing A-L boundary is Type 1 (i.e., suggesting that blood or bloodied fluid is following air in the conduit) (632), and at least most of the pixel color values between the outgoing A-L boundary and the inlet boundary are generally typical of "blood" pixels (633), then the flow type may be classified as laminar liquid (638). For example, as shown in FIG. 14, a conduit including blood or bloodied fluid will result in the conduit image region having higher red (R) pixel color values and lower green (G) and blue (B) pixel color values along the conduit path. Otherwise, if the outgoing A-L boundary is not Type 2 or pixel color values between the outgoing A-L boundary are not "blood" pixels, then other classification tests may be performed (639).

In another variation of classifying the flow type as laminar liquid, classifying the flow type 230 may include determining that the flow type is not classified as any other flow type classification. In other words, the flow type may by default be laminar liquid. For instance, as shown in FIG. 6, if the flow type not classified as laminar liquid because the outgoing A-L boundary is not Type 1 (632) and/or pixels between the outgoing A-L boundary and inlet boundary are "blood" pixels (633), then other classification tests may be performed (639). If the flow type is still neither classified as air nor as turbulent liquid, then the method may include classifying the flow type as laminar liquid (638). In other variations, any of the other classification flow types (e.g., air, turbulent liquid) may be considered a default flow type classification.

Other Flow Type Classifications

In other variations, the flow type in each image may be classified as "mostly air" or "mostly liquid" (e.g., based on an assumption that each point in time represented by an image in the time series of images, the conduit includes either a negligible amount of blood or a negligible amount of air). For example, the flow type may be classified as "mostly air" in any one or more of the variations for classifying flow type as air, as described above. Additionally, the flow type may be described as "mostly liquid" if the flow type is not classified as "mostly air", and/or based on any one or more of the variations for classifying the flow type as turbulent liquid or laminar liquid, as described above. Furthermore, one or more classifications for flow types ranging between "mostly air" and "mostly liquid" may be employed for more precision (e.g., corresponding to different percentages of air or liquid present in the conduit, such as 10% air, 20% air, etc.), where the flow type may be classified, for example, based on the bubble-detection algorithm described above with reference to 434, or a color segmentation algorithm described above. In some instances, these variations with more precise classifications may avoid overestimating the amount of time considered to be "mostly blood" flow, thereby leading to a more accurate estimation of volumetric flow rate, etc.

In some other variations, the flow type may additionally or alternatively be classified as continuous flow, backflow, or "start-up flow." Continuous flow is substantially steady-state flow in which the conduit contains substantially all blood and substantially no air. Backflow includes bubbles inside the conduit and tends to occur when the vacuum source loses suction. "Start-up flow" is a transition between backflow and continuous flow and tends to occur when the vacuum source regains suction. In one variation, classification of the flow type as "start-up flow" for a current image frame of interest may include applying a bubble detection algorithm (e.g., described above) and checking whether a number of start-up flow conditions exist. The start-up flow conditions may include (i) a newly incoming bubble edge has no other bubble edges downstream of it in the current frame of interest, (ii) the average red pixel color values in the conduit image region downstream of the newly incoming bubble edge is below a predetermined threshold value, (iii) conditions (i) and (ii) are met in the image frame immediately preceding the current image frame of interest, and (iv) the newly incoming bubble edge has moved downstream at least some minimum distance compared to its location in the image frame immediately preceding the current image frame of interest. If the newly incoming bubble edge meets these criteria, it may be classified as a "start-up edge" and the flow type is then classified as "start-up flow" until the start-up edge disappears from the conduit image region.

Figure 10A:
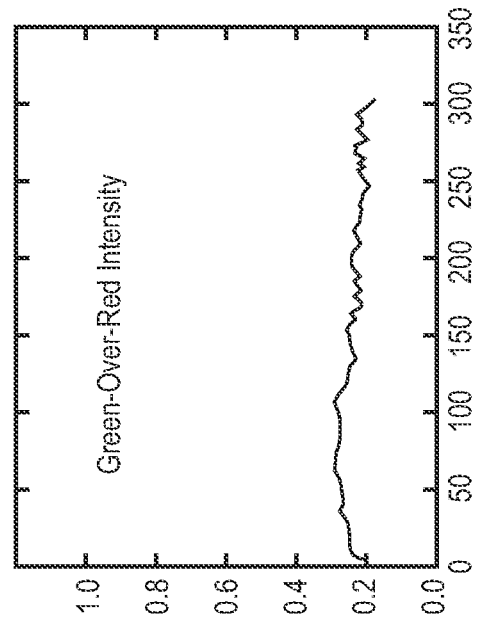
FIGS. 10A-10D depict exemplary characteristics of a "continuous" flow type classification.
Figure 10B:
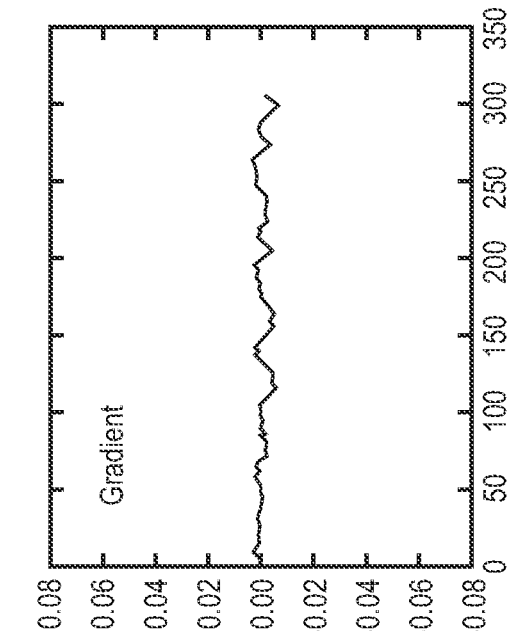
Figure 10C:
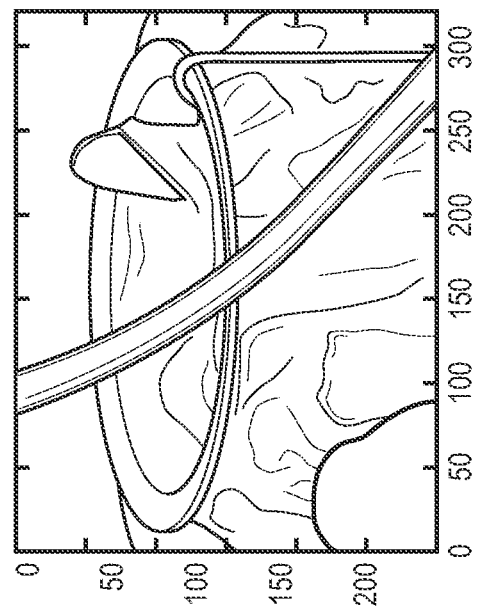
Figure 10D:
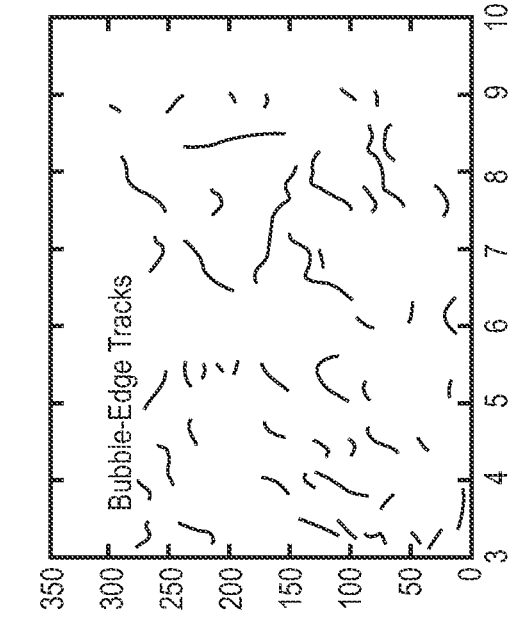

After the start-up edge disappears, the flow type may be classified as continuous flow until another bubble edge is detected. As shown in FIGS. 10A-10D, continuous flow (FIG. 10A) may also be suggested by a somewhat generally uniform green-to-red intensity ratio profile along the conduit image region (FIG. 10B), where the green-to-red intensity ratio profile has generally zero or otherwise minimal gradient (FIG. 10D). During continuous flow, the conduit image region may be monitored for features that may indicate new bubble edges in the flow (e.g., by the detection methods described above, applied to every image frame). These features may be evaluated and, if appropriate, collated into bubble edge tracks or paths (FIG. 10C) (e.g., using pixel tracking techniques, or other suitable tracking techniques). In one variation, the classification of continuous flow may persist as long as substantially no new bubble edge tracks are detected in this manner. In another variation, the classification of continuous flow may persist as long as the quantity of new bubble edge tracks is lower than a predetermined threshold (e.g., absolute number of new bubble edge tracks, percentage of new bubble edge tracks relative to fluid volume, rate of appearance of new bubble edge tracks, etc.).

Figure 11A:
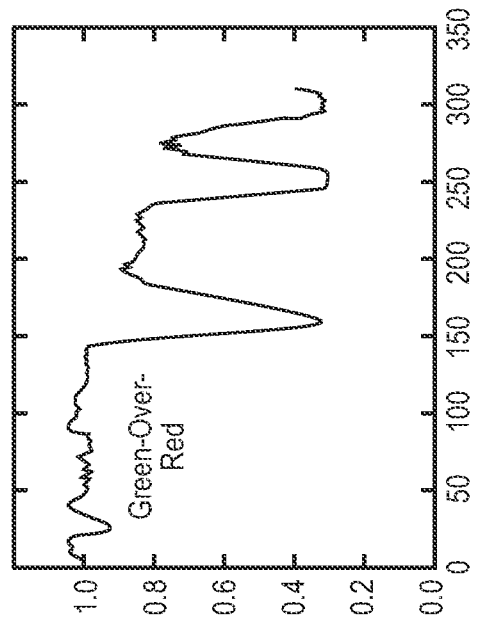
FIGS. 11A-11D depict exemplary characteristics of a "backflow" flow type classification.
Figure 11B:
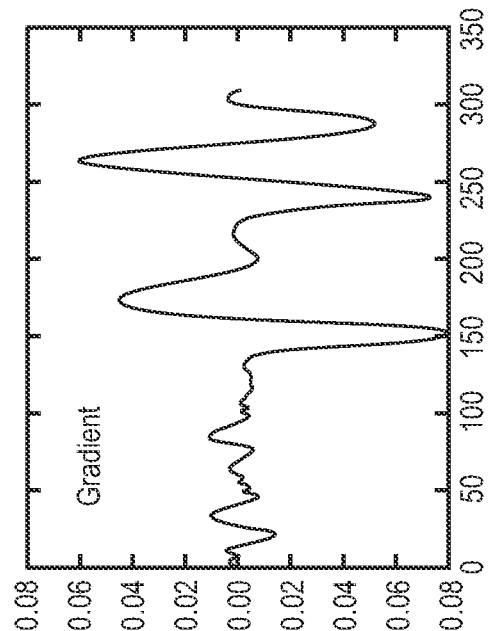
Figure 11C:
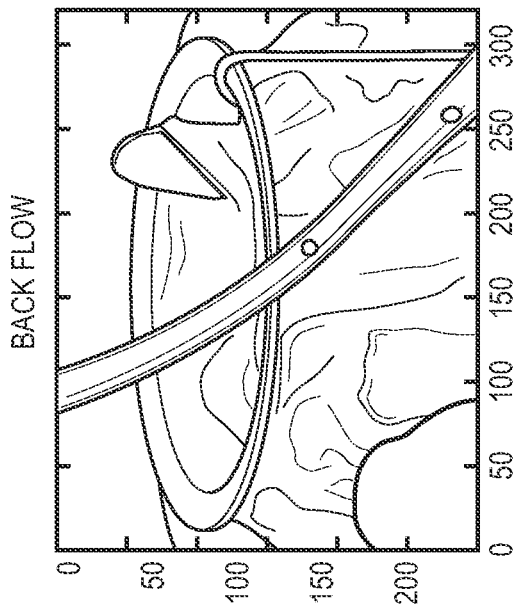
Figure 11D:
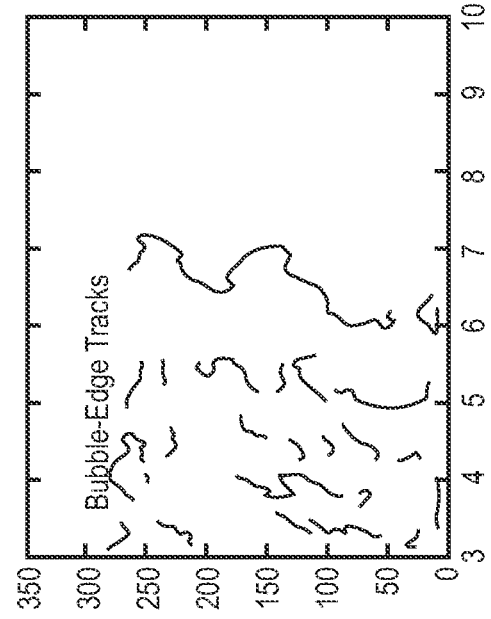

Once another bubble edge is detected, the flow type may be classified as backflow until another start-up edge is detected in the images. For example, as shown in FIGS. 11A-11D, backflow (FIG. 11A) may not only suggested by the presence of bubble edges (FIG. 11C), but also may be suggested by a significantly non-uniform green-to-red intensity ratio profile along the conduit image region (FIG. 11B), as emphasized by its gradient peaks (FIG. 11D). As another example, backflow may be identified based on pixel tracking techniques, as further described below.

Volumetric Flow Rate

Generally, a volumetric flow rate of fluid through the conduit may be estimated for a current image frame of interest (or over a period of time between the current image frame of interest and preceding image). In some variations, the method 200 includes estimating volumetric flow rate of fluids in the conduit 250 for each image, based at least in part on the classification of the flow type for the image. For instance the volumetric flow rate for a particular image (or images) may be estimated in different manners depending on whether the flow type for that image (or images) is classified as air, turbulent liquid, or laminar liquid.

Figure 7:
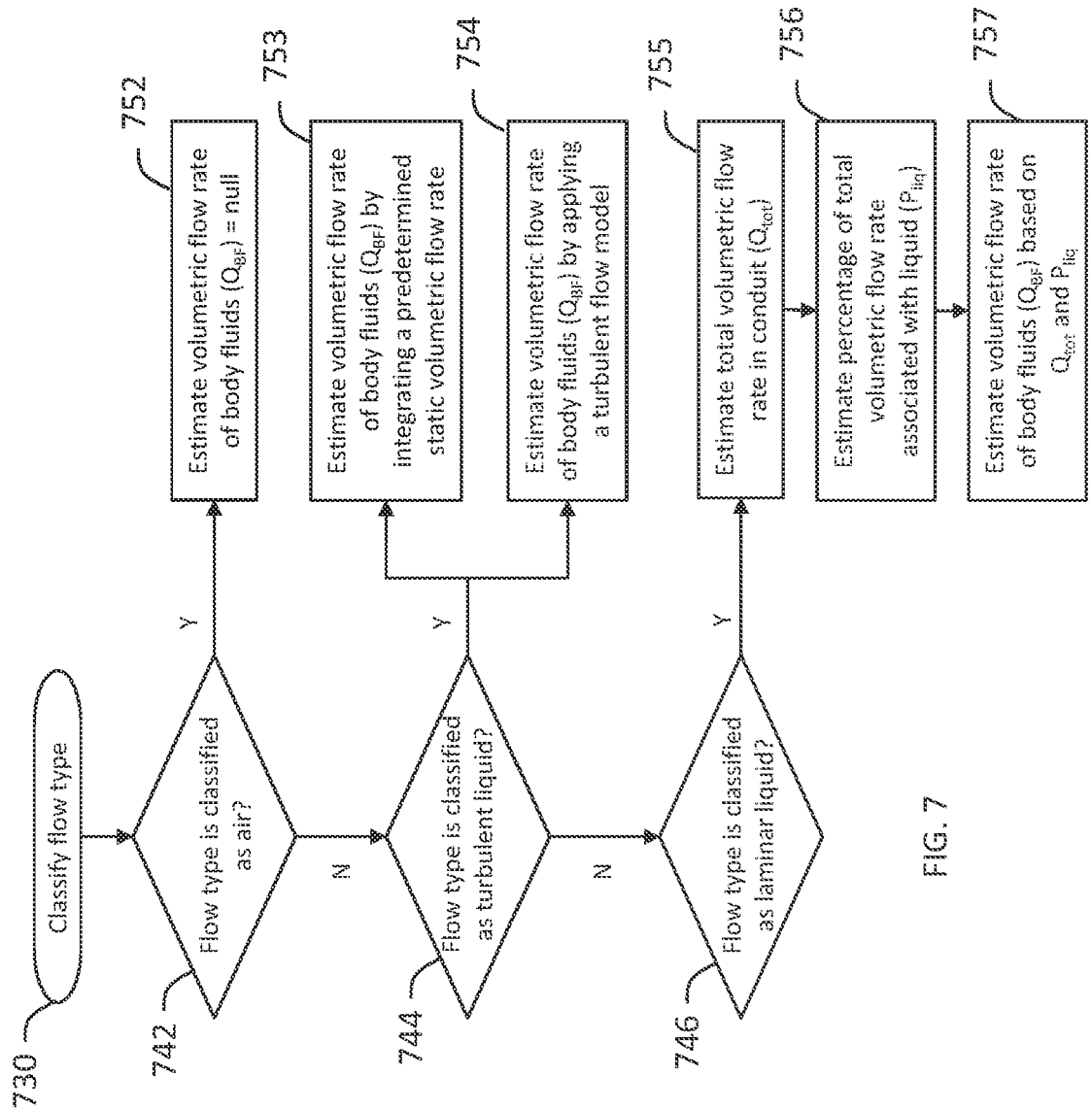
FIG. 7 is a flowchart summarizing variations of estimating volumetric flow rate through a conduit.

As shown in FIG. 7, flow type may be classified (730). In some variations, if the flow type is classified as air (742), then volumetric flow rate of patient fluids in the conduit may be estimated as about zero or null (752). In other words, it may be assumed that there is no passage of patient fluids during the periods of times in which the conduit is classified as carrying only air.

In some variations, if the flow type is classified as turbulent liquid (744), then the volumetric flow rate of patient fluids in the conduit may be estimated in one or more of several manners. In one variation, the volumetric flow rate of body fluids through the conduit ($Q_{BF}$) may be estimated by integrating a predetermined static volumetric flow rate value over a turbulent period of time (753). More specifically, the predetermined static volumetric flow rate value may be an estimated volumetric flow rate value for turbulent flow (e.g., determined by empirical or theoretical techniques), and the turbulent period of time may include a period of time corresponding to a sequence of images in which the flow type is classified as turbulent. In another variation, $Q_{BF}$ through the conduit may be estimated by applying a turbulent flow model (754). For instance, the time series of images may image the conduit against a patterned background (e.g., a black and white patterned grid) which is on a backing surface on the conduit or a separate surface behind the conduit. An interference pattern across the patterned background may be apparent in images during turbulent flow. Use of machine vision techniques, a parametric model, or template matching techniques may characterize the interference pattern in a current image frame of interest (or differences in the interference pattern between sequential image frames) so as to correlate the interference pattern with an estimate volumetric flow rate.

In some variations, if the flow type is classified as laminar liquid (746), then the volumetric flow rate of patient fluids in the conduit may be estimated in one or more of several manners. In one variation, the volumetric flow rate $Q_{BF}$ may be estimated by estimating a total volumetric flow rate ($Q_{tot}$) in the conduit (755) and determining a proportion of the total volumetric flow rate associated with liquid ($P_{liq}$) (756). The volumetric flow rate $Q_{BF}$ may then be estimated based on $Q_{tot}$ and $P_{liq}$ (757). $Q_{tot}$ may be estimated in part by detecting and tracking one or more air-liquid boundaries in the conduit image region. In particular, an air-liquid boundary may be tracked over a period of time between the current image frame of interest and a subsequent image or images (or between the preceding image or images and the current image frame of interest) to identify a distance (e.g., pixel count) traversed by the air-liquid boundary over the tracked period of time. Additionally or alternatively, a pixel cluster (e.g., with a signature pattern of pixel color values) may be tracked over a period of time. A flow rate may be estimated by dividing the distance traversed (by the air-liquid boundary, pixel cluster, or other feature) by the tracked period of time. The total volumetric flow rate $Q_{tot}$ can be estimated based on the estimated flow rate and known cross-sectional flow area of the conduit. Alternatively, estimating $Q_{tot}$ may include assuming a predetermined total volumetric flow rate based on one or more system parameters (e.g., vacuum pressure, internal cross-sectional flow area of the tubing and/or conduit, the length of tubing, the viscosity of the liquid, etc.). Some or all of these system parameters may be predetermined, or may be estimated based on analysis of the images (e.g., viscosity of the liquid based on the estimated blood component concentration of the fluid, where clearer fluid exhibits flower viscosity and higher volumetric flow rates compared to darker fluid, etc.).

The proportion $P_{liq}$ of the total volumetric flow rate $Q_{tot}$ that is associated with liquid (756) may be estimated by a color segmentation technique. For example, the color segmentation technique may include identifying one or more subregions of the conduit between air-liquid boundaries and classifying the subregions as "blood" or "air" based on pixel color values. A percentage of flow that is associated with liquid may then be estimated based on the ratio of aggregate length of "blood" subregions and total length of the conduit image region. Finally, the volumetric flow rate of body fluids $Q_{BF}$ may be estimated based on $Q_{tot}$ and $P_{liq}$ (757) (e.g., multiplying $Q_{tot}$ and percentage value of $P_{liq}$).

In other variations (e.g., where no air-liquid boundaries are detected in a current image frame of interest), a static or dynamic estimate of volumetric flow rate may be employed. For example, for an image generally exhibiting biased red pixel color values in the conduit image region, it may be assumed that the conduit is fully filled with patient fluid (e.g., blood) at that point in time, such that a static volumetric flow rate (e.g., 1 mL/s) is assumed for that point in time.

Volume of Fluids

In some variations, the method 200 includes estimating a volume of fluids 260 that has passed into or through the conduit, which over time may enable estimation of the volume of patient fluids lost by the patient during the surgical procedure, as a running tally updated throughout the surgical procedure and/or summed at the end of the surgical procedure. For example, it may be of interest to estimate the volume of patient fluids that has passed into or through the conduit over a predetermined period of time (e.g., corresponding to a period of time between sequential images).

In one variation, the estimated volume of fluids that has passed into or through the conduit during a predetermined period of time may be based on the estimated volumetric flow rate and the predetermined period of time. For example, the volume of fluids may be estimated by multiplying the volumetric flow rate and the predetermined period of time. For instance, given a volumetric flow rate of 0.5 mL/sec, about 2.5 mL may pass through the conduit over a period of 5 seconds.

In another variation, the estimated volume of fluids that has passed into or through the conduit during a predetermined period of time may be based on an estimated flow rate (e.g., average flow rate) during the predetermined period of time and a sampling rate of the camera that captured the time series of images. For example, a real distance traversed by the volume of fluids passing into or through the conduit may be estimated by multiplying the estimated flow rate and the predetermined period of time. The flow rate may, for example, be estimated by dividing the distance traversed (by an air-liquid boundary, pixel cluster, or other feature) by the predetermined period of time. After estimating the real distance traversed by the volume of fluids, the volume of fluids can be quantified by multiplying the real distance traversed and the cross-sectional fill area of the traversed portion of the conduit.

In another variation, the estimated volume of fluids that has passed into or through the conduit during a period of time may be based on the volumetric dimensions of the conduit portion corresponding to the conduit image region. For instance, estimating the volume of fluids may include identifying and tracking a pixel cluster that traverses the length of the conduit image region, and determining the period of time it takes for the pixel cluster to traverse the length of the conduit image region. Over this period of time, it can be assumed that the quantity of fluid that has passed through the conduit portion corresponding to the conduit image region is equal to the volumetric dimensions of this conduit portion.

Assessment of Blood Component

The method may, in some variations, include assessing the blood component in a volume of liquid in the conduit. For example, the blood component of interest to be assessed may be hemoglobin (Hb), though other blood components (e.g., red blood cells, platelets, plasma, etc.) may additionally or alternatively be assessed.

Estimating Blood Component Concentration

In some variations, the method 200 may include estimating a concentration of a blood component in the estimated volume of fluids 270. Generally, the blood component concentration may be based on pixel color values (e.g., redness intensity, green over red intensity ratio) of fluids, by correlating the pixel color values to associated blood component concentration values. In some variations, the blood component concentration may be estimated only for images in which the flow type is classified as laminar liquid and/or images in which the flow type is classified as turbulent liquid. Template matching techniques and/or parametric techniques may be employed to estimate blood component concentration, as described below.

Figure 8:
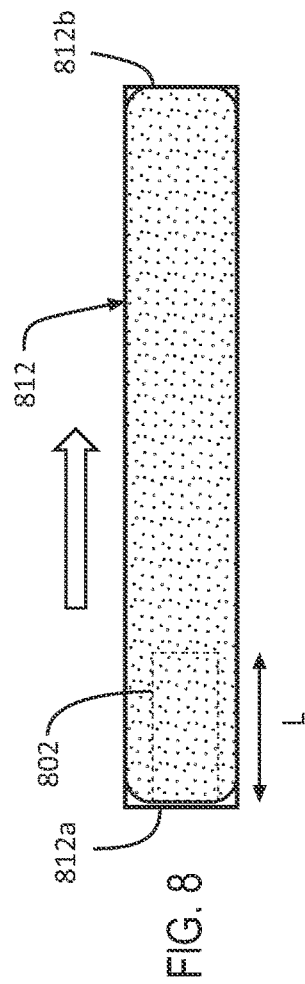
FIG. 8 is a schematic of liquid in a conduit that may be analyzed to estimate concentration of a blood component in the liquid.
Figure 9:
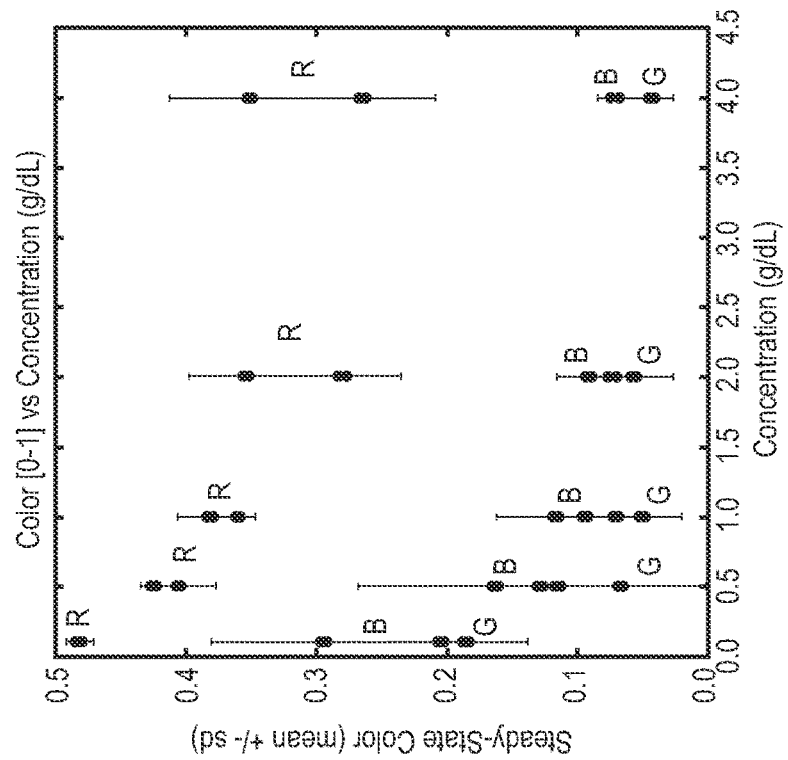
FIG. 9. is an exemplary plot for a parametric model linking pixel color value to hemoglobin concentration.

In a first variation, estimating a concentration of a blood component includes evaluating pixel color values in an analysis region that is based on multiple images. For example, as shown in FIG. 8, in order to estimate the blood component concentration for a volume of fluid that has entered the conduit between two sequential image frames, the method may include identifying an analysis region 802 in the conduit image region 812 of the current image frame of interest. The analysis region 802 may be based on the distance the volume of fluid has traversed ("pixel offset length" labeled "L") since a preceding image frame. The analysis region may, for example, extend from the inlet boundary 812a along the conduit path (e.g., as a line along the centerline of the conduit path, a bounded region tracking the conduit path, etc.) for a distance equal to the pixel offset length "L." In other words, this analysis region includes pixels that represent a volume of patient fluids that was lost between sequential image frames and is to be characterized. In this variation, estimating a concentration of a blood component 170 includes implementing template matching techniques and/or parametric techniques (e.g., with a parametric model similar to that depicted in FIG. 9) to convert pixel color values in the analysis region to a blood component concentration.

For instance, to convert pixel color values in the analysis region to a blood component concentration, template matching techniques may include comparing a redness intensity of the analysis region against redness intensity from template images (e.g., a training set, samples analyzed previously). Each template image may be contained within a library of template images, and may be associated with a known blood, hemoglobin, red blood cell mass or volume, and/or other fluid characteristics. Generally, where the redness intensity of the analysis region is substantially similar to (and is paired with) a closest-matching template image, the analysis region may be estimated as depicting the same blood component concentration as the closest-matching template image.

In one example, K-nearest neighbor methods may be used for the template matching. More specifically, a K-nearest neighbor method may be used to compare the redness intensity of the analysis region with redness intensity values in the template images. Additionally or alternatively, a K-nearest neighbor method may be used to compare greenness intensity and/or a blueness intensity (e.g., in conjunction with a redness intensity) of pixels in the analysis region with greenness and/or blueness intensity values of the template images. Thus, the analysis region may be paired with the closest-matching template image identified with the K-nearest neighbor method, and the analysis region may be estimated as depicting the same blood component concentration associated with the closest-matching template image.

In another example, absolute differences in pixel intensities (e.g., in red, green, and/or blue intensities or color values) may be used for the template matching. Such an absolute difference in pixel intensities may be calculated at a wavelength of light that correlates with the blood component (e.g., at about 400 nm for estimating hemoglobin concentration). More specifically, a sum of absolute differences in pixel intensities may be used to compare pixel intensities between the analysis region and each template image. The closest-matching template image is identified when the sum of absolute differences is substantially minimal compared to other sums of absolute differences calculated for the analysis region and other template images. Thus, the analysis region may be paired with the closest-matching template image identified with the sum of absolute differences method, and the analysis region may be estimated as depicting the same blood component concentration associated with the closest-matching template image.

Additionally, parametric models may be used to convert pixel color values in the analysis region to a blood component concentration. Generally, color values of the template images may be used to train or generate a parametric model (mathematical function, curve, or algorithm etc.) that correlates a pixel color value to a blood component concentration. The parametric model may take an input of pixel intensities or color values and converted it into an output of estimated blood component concentration value.

Additionally or alternatively, the method may employ techniques such as those described in U.S. Pat. No. 8,792,693 filed Jul. 9, 2012 and entitled "SYSTEM AND METHOD FOR ESTIMATING EXTRACORPOREAL BLOOD VOLUME IN A PHYSICAL SAMPLE" and U.S. Pat. No. 8,983,167 filed Jan. 10, 2013 and entitled "SYSTEM AND METHOD FOR ESTIMATING A QUANTITY OF A BLOOD COMPONENT IN A FLUID CANISTER," each of which is hereby incorporated in its entirety by this reference. As another example, a parametric model similar to that depicted in FIG. 9 may be employed.

In another variation, estimating a concentration of a blood component 270 may include considering pixel color values in an analysis region that is based on the current image frame of interest. In this variation, the analysis region may include some portion or the entire area of the conduit image region. For example, in instances in which the conduit has an internal volume of substantially constant or uniform depth, template matching techniques or parametric techniques may be employed (e.g., these pixel color values may be converted into an Hb or other blood component concentration according to a parametric model that links a pixel color value to a blood component concentration) for each pixel or pixel cluster in the analysis region. As another example, in instances in which the conduit has an internal volume of varying depth, a weighted composite averaging model, based on known depth geometry and characteristics of the conduit, may be used. In particular, the weighted composite averaging model may be used to generate composite pixel color values for pixel clusters within the conduit image region, and the composite pixel color values may then be linked to a blood component concentration according to a parametric model as described above. Additionally or alternatively, template matching techniques may be employed to match the color and/or color variations between the inlet and outlet boundaries (e.g., due to variations in the depth of the internal volume of the conduit) to a template line or to a template area of known blood component characteristics. The matched template may, for example, be associated with known blood component concentration, known blood component quantity, and/or known total fluid volume, etc.

In some variations, estimating a concentration of a blood component 270 includes excluding color values of "air" pixels (e.g., pixels having generally unbiased, somewhat uniform RGB component values) from the template matching and/or parametric modeling processes for estimating blood component concentration. Consequently, in these variations, the correlation of pixel color values to blood component concentration may be based substantially exclusively on pixels corresponding to liquid that may include the blood component, while disregarding pixels likely corresponding to air.

Additionally, in some variations, the method 200 may include confirming an initial blood component concentration for a liquid volume at an initial location, by performing one or more repeated blood component concentration estimates for the liquid volume as it moves through the conduit (i.e., estimating the blood component concentration at locations downstream of the initial location). For example, because fluid mixing may improve as the fluid circulates through the conduit, the repeated blood component concentration estimates may be combined (e.g., averaged) or refined to achieve a more accurate overall blood component concentration estimate.

Estimating Blood Component Quantity

The method 200 may include estimating a quantity of the blood component that has passed through the conduit 280. This quantity of blood component, which is an estimation of the quantity of the blood component that has been lost by the patient during the surgical procedure, may be based on the estimated volume of fluids and the estimated concentration of the blood component. For example, volume of the blood component can be estimated by multiplying values for the estimated volume of fluids passed through the conduit and the blood component concentration. Other quantitative metrics, such as mass or weight, may also be derived from the estimated volume of the blood component.

Updating Database

In some variations, the method 200 may include updating a total estimated volume of lost patient fluids, based on the intermittent estimated volumes of fluids that has passed into or through the conduit. Similarly, the method 200 may include updating a total estimated volume of lost blood component based on the intermittent estimated quantities of blood component lost by the patient. The updated total estimates may, for example, be stored in local memory on a handheld or mobile device, communicated to a server or database for remote storage, etc. The update may occur during the surgical procedure (e.g., after each time a volume of fluids is estimated, or periodically such as every five seconds) to provide an estimate of cumulative or total blood loss and/or of cumulative or total blood component loss. Additionally or alternatively, the update may occur at the conclusion of the surgical procedure. For example, as shown in FIGS. 12-14, once an image frame is analyzed to generate estimations of volumetric blood flow, volume of fluids, concentration of blood component, quantity of blood component, etc., one or more of these may be communicated by a processor to a database 1210, 1310, or 1410 (e.g., for medical records, hospital administration purposes, etc.), such as by a wired or wireless connection. Pixel tracking Pixel tracking may be used in addition, or as an alternative, to at least some of the processes described above. For example, pixel tracking may be used to more accurately track volumes of fluid that are flowing in multiple directions (e.g., forward and then backward) within the conduit. Such accuracy may, in some circumstances, reduce the occurrence of "counting" the same fluid volume multiple times, thereby reducing overestimation of patient fluid loss.

In some variations, a pixel or pixel cluster near the inlet boundary line of the conduit image region can be tracked from a current image frame of interest ("entry image frame") to subsequent frames, in order to identify a next image frame ("exit image frame") in which the pixel or pixel cluster crosses or is about to cross the outlet boundary of the conduit image region. Once the entry and exit image frames are identified, intervening image frames may be ignored with respect to analysis of that pixel or pixel cluster. Omitting analysis of intervening frames, and instead focusing on analysis of pixel color values and other aspects of the entry and exit image frames, may be helpful in some circumstances to reduce computer processing requirements and increase speed of fluid assessment. In one example of pixel tracking, a pattern of pixel color values (representing a pixel cluster) in a first frame can be matched to the same or similar pattern of pixel color values within a second subsequent frame, and so on for multiple subsequent frames, thereby following the pattern/pixel cluster throughout a sequence of image frames. Additionally or alternatively, position of a pixel cluster from the first image frame to the second image frame may be confirmed or established based on a known flow velocity of fluid through the conduit and the time period between the first and second image frames.

In some variations, pixel tracking may be used to track liquid backflow through the conduit, in which liquid flows in a reverse direction (outlet to inlet). Under these and other circumstances, it may be desirable to pause analysis of the image frames (e.g., suspend the estimations of volume flow rate, fluid volume, blood component concentration, blood component volume, etc.) until forward flow is detected as reestablished.

Displaying

In some variations, the method may include displaying some or all of the estimated fluid-related information 290 (e.g., volumetric flow rate, fluid volume lost, concentration of a blood component, quantity of blood component lost, cumulative total of total fluid volume lost, cumulative total of quantity of blood component lost, etc.) on a display such as a monitor. The display may reflect, on a substantially real-time basis, the estimated metrics as they are updated throughout and/or after the surgical procedure. Additionally, the method may include displaying some or all of the time series of images as they are captured, alerts to the user (e.g., when estimated total fluid volume lost exceeds a threshold), and/or other suitable information.

Redundancy and Refining

In some variations, other methods for assessing or otherwise characterizing fluids from a patient may be used in conjunction with the method 200. The multiple assessments by different methods can be combined (e.g., averaged) to achieve a more accurate assessment. Additionally or alternatively, the multiple assessments generated by different methods can be compared in order to improve fluid flow classification models, volume flow rate models, blood component concentration models, etc.

For example, additional assessments may be generated by capturing an image of a canister containing fluids, identifying a segment of the image corresponding to a portion of the canister containing fluid, estimating a volume of fluid within the canister based on the image segment (e.g., with edge detection or other machine vision techniques), extracting a color feature from a pixel within the image segment (e.g., with template matching techniques and/or parametric modeling), and/or estimating a content of the blood component within the canister based on the estimated volume of fluid and the concentration of the blood component within the canister. Other additional assessments may involve other methods for analyzing contents of a suction canister or other fluid receptacle that collects fluids lost by the patient (e.g., as described in U.S. Pat. No. 8,983,167).

III. Systems for Characterizing Fluids from a Patient

A system for characterizing fluids from a patient may include or interact with a fluid conduit configured to receive patient fluids and subsequently deliver the same patient fluid into a receptacle. For example, as shown in FIG. 1, the collected patient fluids may be passed into a conduit 110, and may continue to flow into a receptacle 130 (e.g., canister or sealed waste management system). In some variations, the conduit 110 and and/or fluid retrieval device 120 may be in fluidic communication with a vacuum source (e.g., a vacuum pump 140 provided by receptacle 130) configured to provide suction to the fluid retrieval device 120, thereby facilitating the collection of patient fluids. The patient fluid that flows into the conduit can be imaged, and these can be analyzed in order to characterize the patient fluid in the conduit.

As shown in FIG. 1, the system 100 includes at least one processor 152, and memory 154 having instructions stored therein, wherein when the processor executes the stored instructions, the system is configured to receive a time series of images of a conduit receiving fluids, and to characterize the fluid in the conduit based on analysis of the time series of images. In some variations, the system 100 may further include a camera 156 for obtaining color images of the conduit during the surgical procedure and/or display 158 for displaying one or more of the images and/or information characterizing the fluid in the conduit. Additionally, in some variations, the system 100 may include or interface with the conduit 110. These and other various components of the system are described in further detail below.

In some variations, some or all of the system may be in an integrated device and placed near the patient during the surgical procedure (e.g., in the operating room) to assess patient fluids that are collected and passed through the conduit. For instance, the system 100 may at least partially include a handheld or mobile electronic computing device 150 (e.g., that executes a native fluid analysis application program). Such a handheld or mobile device may, for example, be a tablet computer, laptop computer, mobile smartphone, etc. which may include a camera 1530, a processor 1510, and a display 1540. However, in other variations some or all of the components may be separated as discrete interconnected devices. For example, the camera and display may be located substantially near the conduit during the surgical procedure (e.g., in the operating room) while the processor may be located at a remote location (e.g., in the operating room separate from the camera and/or display, or outside the operating room), communicating with the camera and display through a wired or wireless connection or other network.

Processor

Generally, one or more processors 152 may be configured to execute the instructions that are stored in memory 154 such that, when it executes the instructions, the processor 152 performs aspects of the methods described herein. The instructions may be executed by computer-executable components integrated with the application, applet, host, server, network, website, communication service, communication interface, hardware/firmware/software elements of a user computer or mobile device, wristband, smartphone, or any suitable combination thereof. The instructions may be stored on memory or other computer-readable medium such as RAMs, ROMs, flash memory, EEPROMs, optical devices (e.g., CD or DVD), hard drives, floppy drives, or any suitable device.

Generally, the one or more processors 152 may be configured to perform the methods substantially as described herein. For instance, the one or more processors 152 may be configured to: receive a time series of images of a conduit receiving fluids from the patient, identify a conduit image region in each of the images, and classify a flow type through the conduit based on an evaluation of the conduit image region in the time series of images. In some variations, the processor 152 may be further configured to generate the time series of images. In some variations, the processor 152 may be further configured to estimate a volumetric flow rate of body fluids in the conduit based at least in part on the classification of the flow type, estimate a volume of fluids that has passed into or through the conduit within a predetermined period of time, estimate a concentration of a blood component in the estimated volume of fluids, and/or estimate a quantity of the blood component that has passed into or through the conduit within a predetermined period of time.

As described above, in some variations, the one or more processors 152 may be integrated into a handheld or mobile device 150. In other variations, the one or more processors 152 can be incorporated into a computing device or system, such as a cloud-based computer system, a mainframe computer system, a grid-computer system, or other suitable computer system. Additionally or alternatively, the one or more processors may be incorporated into a remote server that receives the images, analyzes the images to characterize fluids in the conduit and provide fluid-related information, and/or transmit the fluid-related information to another computing device having a display for displaying the fluid-related information to a user.

Camera

The system may further include a camera 156 that functions to generate a time series of images of the conduit during the surgical procedure, such as a video stream or other sequence of images at a particular frame rate. The camera 156 may include at least one optical image sensor (e.g., CCD, CMOS, etc.) that captures a color optical digital image with red, green, and blue (RGB) color components for the pixels, and/or other suitable optical components. For example, the camera 156 may include a single image sensor paired with suitable corresponding optics and/or filters (e.g., color filter arrays such as a Bayer pattern filter). As another example, the camera 156 may include multiple image sensors paired with suitable corresponding optics, such as at least one prism or diffractive surface to divide white light into separate color channels (e.g., RGB), each of which is detected by a respective image sensor. However, the camera 156 may include any suitable image sensors and other optics components to enable the camera 156 to generate a time series of images.

The camera may be a video camera that captures a series of images at a high frame rate (e.g., at least about 20 frames per second) for generating images as a sufficient frequency to capture all volumes of fluid flowing through the conduit.

The camera may be configured to transmit the time series of images to the processor for analysis, and/or to a database that stores the images. As previously described, the camera may be integrated in the same device as one or more of the other components of the system 100, or the camera may be a separate component that communicates the image data to the other components.

Display

The display 158 functions to display or otherwise communicate to a user (e.g., doctor, nurse) information that is generated by the system 100, including but not limited to patient information, the time series of images, and/or fluid-related information estimated as described herein. The display 158 may include a screen on a handheld or mobile device, a computer monitor, a television screen, a projector screen, or other suitable display.

In some variations, the display 158 may be configured to display a user interface that enables the user to interact with displayed information. For example, the user interface may enable the user to manipulate the images or define a conduit image region as described above. As another example, the user interface may enable the user to select display options (e.g., font, color, language) and/or content (e.g., patient information, fluid-related information, alerts). In these variations, the display may be user-interactive and include a resistive or capacitive touch screen that is responsive to skin, a stylet, or other user contact. In other variations, the display 158 may be user-interactive via a cursor controlled by a mouse, keyboard, or other input device.

In some variations, the system may additionally or alternatively include an audio system that communicates fluid-related information to the user. The display and/or the audio system may provide alerts upon one or more estimations meeting a threshold (e.g., estimated quantity of fluids or blood component exceeds a threshold), which may be useful to prompt certain actions in response, such as providing a blood transfusion In some variations, as shown in FIG. 1, the display may be integrated in the same device as one or more of the other components of the system 100, or may be a standalone separate monitor, screen, or other display.

Conduit

The conduit 110 functions to contain a volume of collected patient fluids such that the volume of collected patient fluids may be imaged. As described above and shown in FIG. 1, the conduit may be placed "in-line" or in series with a fluid retrieval device 120 or other fluid source providing fluids to the conduit, and/or a receptacle 130 receiving fluids from the conduit. The conduit 110 may include features at one or both its ends to facilitate a fluidic connection to suction tubing leading to and from the conduit, or directly to the fluid retrieval device 120 (or other fluid source) or receptacle 130. For example, the conduit 110 may include a fitting with a port or other feature configured to couple to tubing so as to establish fluidic communication between the tubing and the conduit 110. As another example, the conduit 110 may include nozzle-like features at one or both of its ends to help shape flow of fluids into and out of the conduit 110. Additionally or alternatively, the conduit may include vanes or channels extending into or dividing the internal volume to create multiple orifices of smaller cross-sections, which may reduce turbulent flow (and improve laminar flow) of liquid passing through the conduit 110.

Generally, the conduit may define an internal volume having an inlet through which fluids enter the internal volume, and an outlet through which fluids exit the internal volume. The internal volume may have a cross-sectional area and/or geometry that varies along its length, or alternatively a substantially uniform cross-section along its length. The internal volume (or a portion of the internal volume) may be the primary region of interest in the time series of images. Accordingly, the camera 156 may be oriented such that its field of view includes at least a portion of the internal volume of the conduit.

At least a portion of the internal volume of the conduit may include a shallow section (as measured along the camera optical axis) so as to improve the analysis of fluids having a high concentration of red blood cells (RBC) or hemoglobin. In some variations (e.g., involving optical imaging with visible light), this conduit feature may be helpful because in instances in which blood has a high RBC concentration, a deep or thick volume of the blood may be too opaque or optically "dark" for useful pixel color visualization in an image of the blood. This is because a deep or thick volume of blood having a high RBC concentration may scatter and/or absorb nearly all incident light, leading to insufficient light transmission through the blood. Consequently, such opacity may limit the amount of blood component concentration information that may be derived from an image of the blood. Furthermore, blood with higher RBC concentrations must be imaged in shallower or thinner volumes in order to decrease opacity (i.e., the volume depth or thickness at which opacity is avoided is generally inversely proportional to the RBC concentration). Therefore, considering conduit 110, to increase the range of high fluid RBC concentrations at which optical images of the fluid in the conduit can provide useful blood component concentration information, at least a portion of the internal volume of the conduit 110 may include a shallow section or region, as measured along the camera optical axis. For example, in some variations, the shallow section may measure between about 0.5 mm and about 5 mm deep (along the camera optical axis), though the shallow section may be suitably less or more deep depending on factors such as intensity of the incident light, wavelengths of the incident light, the thickness and type of conduit material, resolution or sensitivity of the camera, etc.

Additionally or alternatively, at least a portion of the internal volume of the conduit may include a deep section (as measured along the camera optical axis) so as to improve the analysis of fluids having a low concentration of RBCs or hemoglobin. In some variations (e.g., involving optical imaging with visible light), this conduit feature may be helpful because in instances in which blood has a low RBC concentration, a shallower or thinner volume of blood may be too optically clear, akin to water or saline, for useful pixel color visualization in an image of the blood. This is because a shallow or thin volume of blood having a low RBC concentration may not scatter and/or absorb enough incident light in order for the blood to be optically distinguishable from water, saline, or other low RBC concentration fluids. Consequently, such optical clarity may limit the amount of blood component concentration information that may be derived from an image of the blood. For example, in some instances a fluid with low RBC concentration may not have optically detectable blood components. Furthermore, blood with lower RBC concentrations may have to be imaged in deeper or thicker volumes in order to decrease optical clarity (i.e., the volume depth or thickness at which optical clarity is avoided is generally inversely proportional to the RBC concentration). Therefore, considering the characteristics of conduit 110, to increase the range of low fluid RBC concentrations at which images of the fluid in the conduit can provide useful blood component concentration information, at least a portion of the internal volume of the conduit 110 may include a deep section or region, as measured along the camera optical axis. For example, in some variations, the deep section may measure between about 5 mm and about 20 mm deep (along the camera optical axis), though the deep section may be suitably less or more deep depending on factors such as intensity of the incident light, wavelengths of the incident light, the thickness and type of conduit material, resolution or sensitivity of the camera, etc.

Figures 15A, 15B:
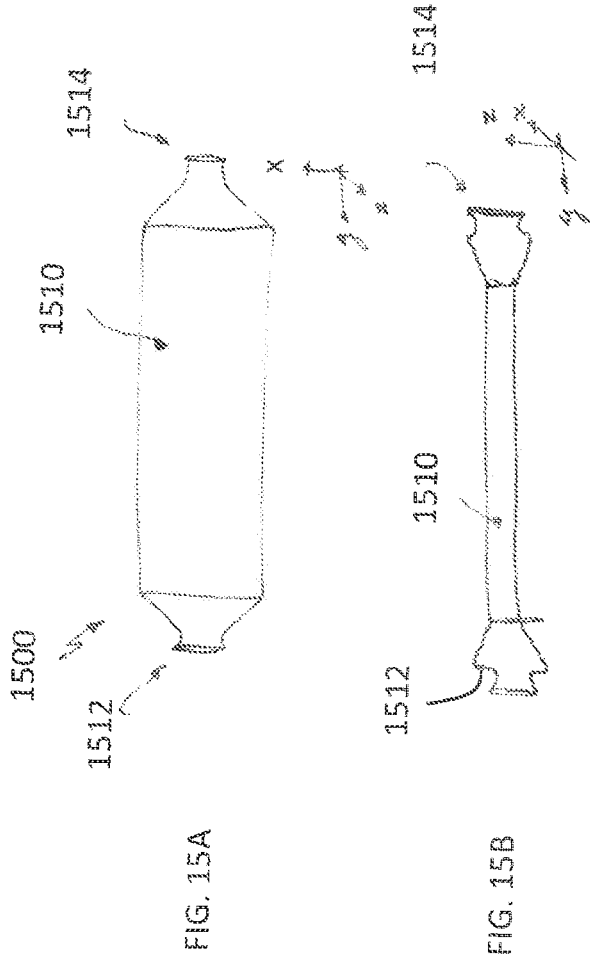
FIGS. 15A and 15B are schematic depictions of a plan view and a side view, respectively, of one variation of a conduit.

In some variations, the conduit (or at least the internal volume) may be generally elongated, as shown in the exemplary conduits of FIGS. 15A-15B and FIGS. 16A-16B, though the geometry of the conduit may vary. For instance, as shown in FIGS. 15A-15B, one exemplary conduit 1500 is elongated, wide, and generally flattened or planar, and the cross-section of the internal volume 1510 may be substantially uniform along the length of the internal volume. In particular, the conduit 1500 has an internal volume 1510 between inlet 1512 and outlet 1514 that is long along its Y-axis, broad or wide along its X-axis, and shallow or narrow along its Z-axis. The ratio of sides of the X-Z cross-section may, for example, be about 20:1. In some variations, the conduit 1500 may be oriented relative to the camera so as to be imaged as presented in FIG. 15A).

Figure 16A:
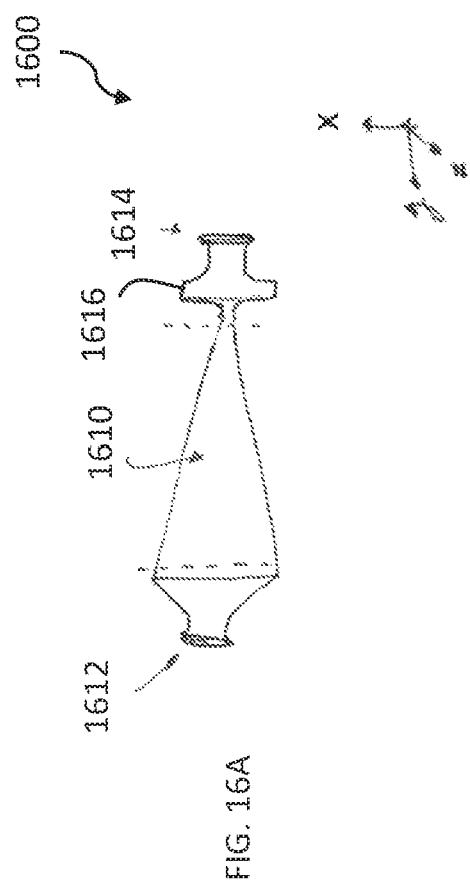
FIGS. 16A and 16B are schematic depictions of a plan view and a side view, respectively, of another variation of a conduit.
Figure 16B:
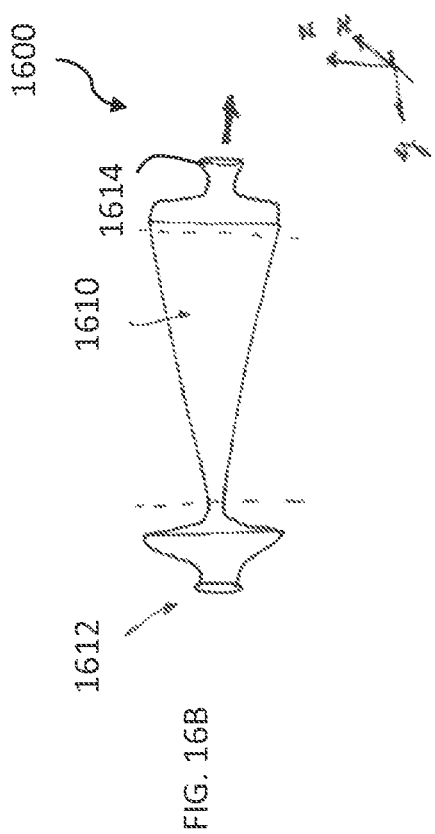

As shown in FIGS. 16A-16B, another exemplary conduit 1600 is elongated and the cross-section of the internal volume 1610 is tapered along the length of the internal volume in multiple planes. In particular, the conduit 1600 has an internal volume 1610 that tapers in a first plane (e.g., X-Y plane as shown in FIG. 16A) from a wider inlet 1612 to a narrower outlet 1614, and additionally tapers in a second plane (e.g., Y-Z plane as shown in FIG. 16B) from a wider outlet 1614 to a narrower inlet 1612. In some variations, the conduit 1600 may be oriented relative to the camera such that camera images both a shallow section and a deep section of the internal volume 1610. For example, the conduit may be imaged as presented in FIG. 16A, including a wider, shallow section near the inlet 1612 and a narrower, deeper section near the outlet 1614. Alternatively, the conduit may be imaged as presented in FIG. 16B.

In some variations, the internal volume of the conduit may include an entrapment region that contains a slowed volume of fluid passing through the conduit. For instance, as shown in FIG. 16A, an entrapment region 1616 located near the outlet 1614 functions to slow the flow rate of the fluid. The entrapment region 1616 may, for example, include a region of expanded volume or constricted area so as to reduce the speed of the fluid in the entrapment region. Within the entrapment region, the slowed fluid may be more easily analyzed with the methods described herein (e.g., lessening the requirement for a high speed camera). The conduit image region may be identified as including the entrapment region 1616*m* which may provide an approximation of an instantaneous flow state.

In some variations, the conduit may include one or more optical fiducials. The optical fiducial may be coupled to or integral with the conduit or the packaging of the conduit, and be associated with conduit-related information. For example, the optical fiducial may be adhered to a surface of the conduit or packaging, printed onto a surface of the conduit or packaging, molded or etched into the conduit or packaging, or associated with the conduit or packaging in any suitable manner. The fiducial can, for example, include a quick-response (QR) code, a barcode, alphanumerical code, symbolic marker, or other optical identification marker. Conduit-related information, which may be accessed by scanning or looking up the fiducial in a database, may include, for instance, a type of the conduit, geometry and/or dimensions of an internal volume of the conduit, a flow resistance of the conduit, etc.

In some variations, the optical fiducial may include a color fiducial. The color fiducial may be coupled to or integral with the conduit or the packaging of the conduit, and be associated with color-related information to enable color normalization of the time series of images, such as to compensate for variations in lighting conditions. In some variations, the color fiducial may display one or more red hues. The color fiducial may include, for example, a grid including boxes of different red hues, each of which has an assigned or known color value. The time series of images can be color-adjusted (e.g., adjustment of exposure, contrast, saturation, temperature, tint, etc.) until an imaged color fiducial has a color value matching the assigned or known color value of the color fiducial.

Generally, the conduit 110 may be substantially transparent or translucent to white light. For example, the conduit 110 may be made of blow-molded polyethylene terephthalate (PET) or injection-molded Poly(methyl methacrylate) (PMMA), though other plastics, glass, or other suitable materials may be used. In some variations, the conduit material may be somewhat rigid or semi-rigid and resistant to deformation as a result of being handled in a medical treatment setting and/or from suction, so as to help maintain the consistency of the size, location, and shape of the conduit in the time series of images. In some variations, the conduit 110 may include a transparent or translucent portion of suction tubing. Additionally, the conduit 110 may include an anti-glare finish, anti-glare coating, or anti-glare decal.

Kits

A kit may include any part of the systems described herein. In further aspects, a kit may additionally or alternatively include a tangible non-transitory computer readable medium having computer-executable (readable) program code embedded thereon that may provide instructions for causing one or more processors, when executing the instructions, to perform one or more of the methods for characterizing fluids from a patient as described herein. The kit may include instructions for use of at least some of its components, including but not limited to: instructions for installation, use, and/or care of the conduit, user manual for user interface software, instructions for installing the computer-executable (readable) program code with instructions embedded thereon, etc.

As a person skilled in the art will recognize from the previous detailed description and from the figures and claims, modifications and changes can be made to the described and illustrated embodiments without departing from the scope of the invention. Furthermore, different variations of the methods and systems include various combinations and permutations of the steps and other elements described herein.

The invention claimed is:

1. A computer-implemented method for characterizing fluids from a patient, the method comprising:
   receiving a time series of images of a conduit configured to receive the fluids from the patient;
   identifying a conduit image region in the time series of images;
   classifying a flow type of the fluids passing through the conduit as one of air, laminar liquid, and turbulent liquid by evaluating an air-liquid boundary of the fluid within the conduit image region in the time series of images; and
   estimating a volumetric flow rate of the fluids in the conduit based on the classified flow type.

2. The method of claim 1, further comprising classifying the flow type as the laminar liquid based on whether each of an upstream side and a downstream side of the air-liquid boundary is one of liquid and air.

3. The method of claim 2, wherein the step of estimating the volumetric flow rate with the flow type being laminar liquid further comprises:
   determining a total volumetric flow rate of the fluids passing through the conduit; and
   determining a proportion of the total volumetric flow rate associated with the laminar liquid.

4. The method of claim 3, further comprising estimating a volume of the laminar liquid that has passed through the conduit within a predetermined period of time based on the determined proportion.

5. The method of claim 2, further comprising:
   evaluating pixel color intensity values between the air-liquid boundary and a subsequent air-liquid boundary; and
   classifying the flow type as the laminar liquid if the pixel color intensity values are indicative of blood in the conduit.

6. The method of claim 1, wherein the step of generating the flow type further comprises generating a profile for the conduit image region based on a ratio of green-to-red color intensity values for a pixel or pixel cluster within the conduit image region.

7. The method of claim 6, further comprising further classifying the flow type as continuous flow based on the ratio of green-to-red color intensity values being substantially uniform within the conduit image region.

8. The method of claim 6, wherein the ratio of green-to-red color intensity values being approximately 1 is indicative of the pixel or pixel cluster correspond to air, and being other than approximately 1 is indicative that the pixel or pixel cluster corresponds to blood.

9. The method of claim 1, further comprising:
   detecting a quantity of bubbles in the conduit image region based on the air-liquid boundary; and
   classifying the flow type as air if the quantity of bubbles exceeds a predetermined threshold value.

10. The method of claim 9, wherein the step of estimating the volumetric flow rate with the flow type being air further comprises estimating the volumetric flow rate as zero or null.

11. The method of claim 1, further comprising:
    detecting a quantity of pixels in the conduit image region that have one or more predetermined pixel color values; and
    classifying the flow type as air based on a comparison between the quantity of pixels and a predetermined threshold value.

12. The method of claim 1, further comprising classifying the flow type as turbulent liquid if a detected rate of the air-liquid boundary and subsequent air-liquid boundaries exceeds a predetermined threshold.

13. The method of claim 12, wherein the step of estimating the volumetric flow rate with the flow type being turbulent liquid further comprises integrating a static volumetric flow rate.

14. The method of claim 12, wherein the step of estimating the volumetric flow rate with the flow type being turbulent liquid further comprises applying a turbulent flow model.

15. A computer-implemented method for characterizing fluids from a patient, the method comprising:
    receiving a time series of images of a conduit configured to receive the fluids from the patient;
    identifying a conduit image region in the time series of images;
    estimating a concentration of a blood component of the fluids passing through the conduit based on a color intensity value of a pixel or pixel cluster within the conduit image region in the time series of images;
    estimating a volumetric flow rate of the fluids in the conduit by tracking the pixel or pixel cluster within the conduit image region in the time series of images; and
    estimating a volume of blood that has passed through the conduit within a predetermined period of time based on the estimated concentration of the blood component and the estimated volumetric flow rate.

16. The method of claim 15, further comprising determining a proportion of the fluids that is blood.

17. The method of claim 15, further comprising classifying the fluids passing through the conduit as blood or air.

18. A computer-implemented method for characterizing fluids from a patient, the method comprising:
    receiving a time series of images of a conduit configured to receive the fluids from the patient;
    identifying a conduit image region in the time series of images;
    estimating a concentration of a blood component of the fluids passing through the conduit based on the time series of images;

estimating a total volumetric flow rate of the fluids in the conduit;

determining a proportion of the fluid that is blood; and estimating a volume of blood that has passed through the conduit within a predetermined period of time based on the estimated total volumetric flow rate and the determined proportion.

19. The method of claim 18, further comprising classifying the fluids passing through the conduit as blood or air by evaluating pixel or pixel clusters in the time series of images.

20. The method of claim 18, further comprising classifying a flow type of the fluids passing through the conduit as air, laminar liquid, and turbulent liquid, wherein the estimated total volumetric flow rate is based on the classified flow type.

* * * * *